(12) United States Patent
Ogawa et al.

(10) Patent No.: US 11,061,972 B2
(45) Date of Patent: *Jul. 13, 2021

(54) COMPUTING ARCHITECTURE FOR MULTIPLE SEARCH BOTS AND BEHAVIOR BOTS AND RELATED DEVICES AND METHODS

(71) Applicant: FACET LABS, LLC, Los Gatos, CA (US)

(72) Inventors: Stuart Ogawa, Los Gatos, CA (US); Lindsay Alexander Sparks, Seattle, WA (US); Koichi Nishimura, San Jose, CA (US); Wilfred P. So, Mississauga (CA)

(73) Assignee: FACET LABS, LLC, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/072,146

(22) Filed: Oct. 16, 2020

(65) Prior Publication Data

US 2021/0049217 A1 Feb. 18, 2021

Related U.S. Application Data

(63) Continuation of application No. 16/314,702, filed as application No. PCT/US2018/047227 on Aug. 21, 2018, now Pat. No. 10,831,839.

(Continued)

(51) Int. Cl.
*G06F 16/90* (2019.01)
*G06F 16/951* (2019.01)
(Continued)

(52) U.S. Cl.
CPC ............ *G06F 16/951* (2019.01); *G06F 3/167* (2013.01); *G06F 11/302* (2013.01);
(Continued)

(58) Field of Classification Search
None
See application file for complete search history.

(56) References Cited

U.S. PATENT DOCUMENTS 9,552,420 B2 * 1/2017 Liao .................. G06F 16/93
2008/0243785 A1 * 10/2008 Stading ............. G06F 16/9535
(Continued)

*Primary Examiner* — Belix M Ortiz Ditren

(57) ABSTRACT

The amount and variety of data being generated is becoming too extreme for many computing systems to process, and is even more difficult for information systems to provide relevant data to users. A distributed computing system is provided that includes server machines that form a data enablement platform. The platform includes: a plurality of data collectors that stream data over a message bus to a streaming analytics and machine learning engine; a data lake and a massive indexing repository for respectively storing and indexing data; a behavioral analytics and machine learning module; and multiple application programming interfaces (APIs) to interact with the data lake and the massive indexing repository, and to interact with multiple applications. The multiple applications are command cards, and each command card includes a directive module, a memory module, search bots, and behavior bots that operate at least within the data enablement platform.

26 Claims, 23 Drawing Sheets

Related U.S. Application Data

(60) Provisional application No. 62/548,173, filed on Aug. 21, 2017.

(51) Int. Cl.
  *G06N 20/00* (2019.01)
  *G06F 16/9535* (2019.01)
  *G06F 3/16* (2006.01)
  *G06F 11/30* (2006.01)
  *G06F 11/34* (2006.01)
  *G06N 5/04* (2006.01)
  *G10L 13/033* (2013.01)
  *G10L 15/22* (2006.01)

(52) U.S. Cl.
  CPC ...... *G06F 11/3438* (2013.01); *G06F 16/9535* (2019.01); *G06N 5/04* (2013.01); *G06N 20/00* (2019.01); *G10L 13/033* (2013.01); *G10L 15/22* (2013.01)

(56) References Cited

U.S. PATENT DOCUMENTS

| | | | |
|---|---|---|---|
| 2017/0206095 A1* | 7/2017 | Gibbs | G06F 3/011 |
| 2017/0235819 A1* | 8/2017 | Liao | G06Q 50/18 |
| | | | 707/733 |

* cited by examiner

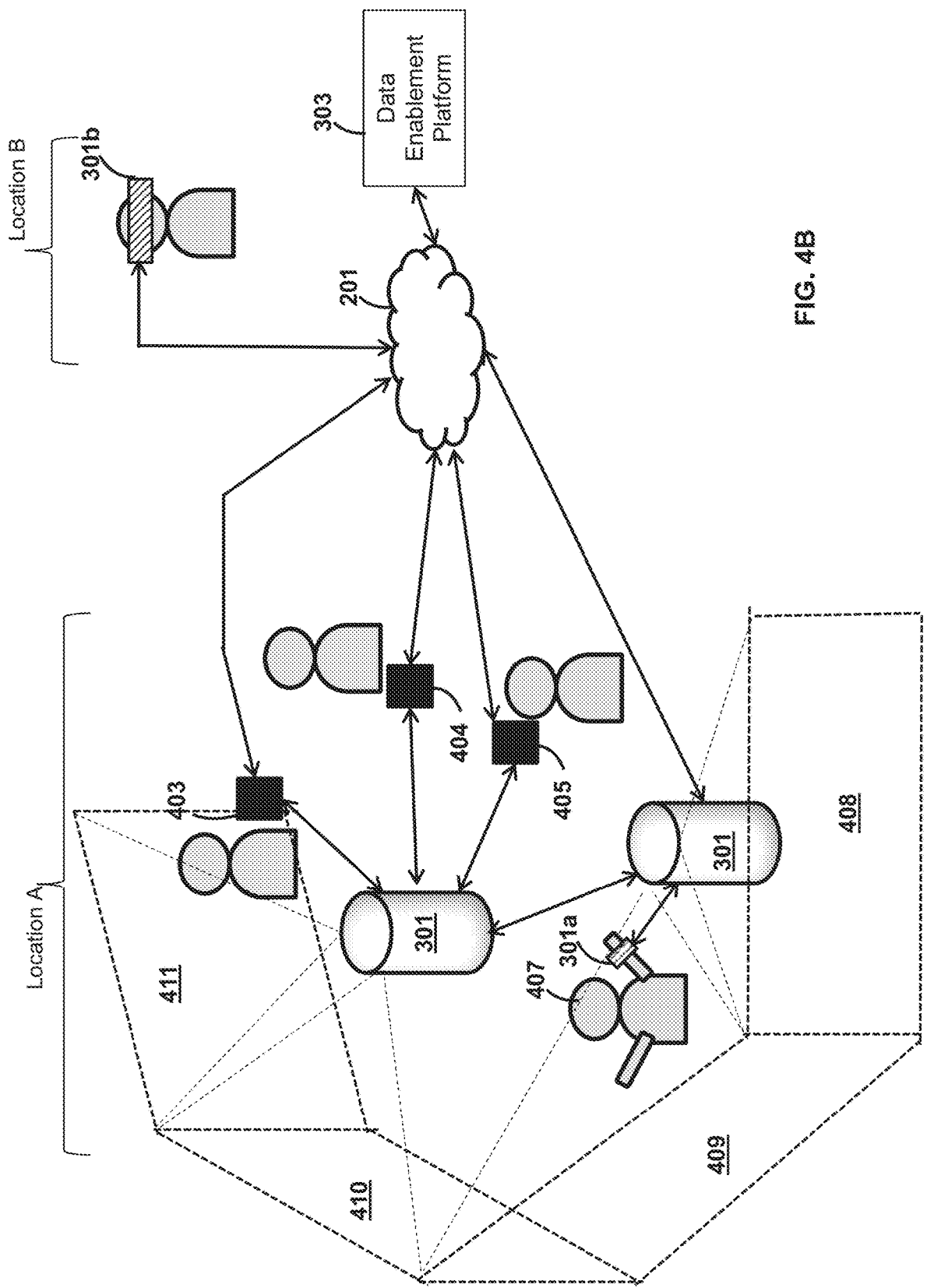

US 11,061,972 B2

COMPUTING ARCHITECTURE FOR MULTIPLE SEARCH BOTS AND BEHAVIOR BOTS AND RELATED DEVICES AND METHODS

CROSS-REFERENCE TO RELATED APPLICATIONS

This patent application is a Continuation application of U.S. patent application Ser. No. 16/314,702, filed on Jan. 2, 2019, and titled "Computing Architecture For Multiple Search Bots And Behavior Bots And Related Devices And Methods"; which is a United States national phase entry of International Application No. PCT/US2018/047227, filed on Aug. 21, 2018, and titled "Computing Architecture For Multiple Search Bots And Behavior Bots And Related Devices And Methods"; which claims priority to U.S. Provisional Patent Application No. 62/548,173, filed on Aug. 21, 2017, and titled "Computing Architecture For Multiple Search Bots And Behavior Bots And Related Devices And Methods"; and the entire contents of these applications are hereby incorporated by reference.

TECHNICAL FIELD

In one aspect, the following generally relates to computing architectures for multiple search bots and behavior bots to process large volumes of data from many different data sources. In another aspect, the following generally relates to user devices and related computing architectures and methods for processing the data and outputting user interface content, including but not limited to audio content or visual content, or both.

DESCRIPTION OF THE RELATED ART

Our information age is growing more and more complex. In the field of "big data", there is an increasing volume of data, an increasing variety of data, and an increasing velocity of data. Using most computing systems, there is too much data to search and too much data is being created for computing systems to keep up.

The amount and variety of data sources are also growing too. There is data being generated by Internet users, by social sites, by companies, by $3^{rd}$ party data companies, by Internet of Things (IoT) devices, and by enterprise systems. Even within the category of social media data, there are many types of data formats, many sources of data, and many different meanings of the data. Even within the category of data from IoT devices, there are numerous types of data formats, many sources of data, and many different meanings of the data. This enormous complexity of data, which will continue to grow, leads to a state of "extreme data" (XD).

Web crawler technology, also called Internet bots or search engine bots, indexes data from various websites. However, this technology is focused on web site data sources and does not take into account extreme data.

It is understood that information systems for machines or for people, or both, are designed to process data to automatically execute actions or to recommend actions. However, these information systems do not have the hardware resources or software resources, or both, to process extreme data.

BRIEF DESCRIPTION OF THE DRAWINGS

Embodiments will now be described by way of example only with reference to the appended drawings wherein:

FIG. 4B is a schematic diagram showing different embodiments of an OCD, including wearable devices, and an OCD embodiment configured to provide augmented reality or virtual reality.

DETAILED DESCRIPTION

Figure 1:
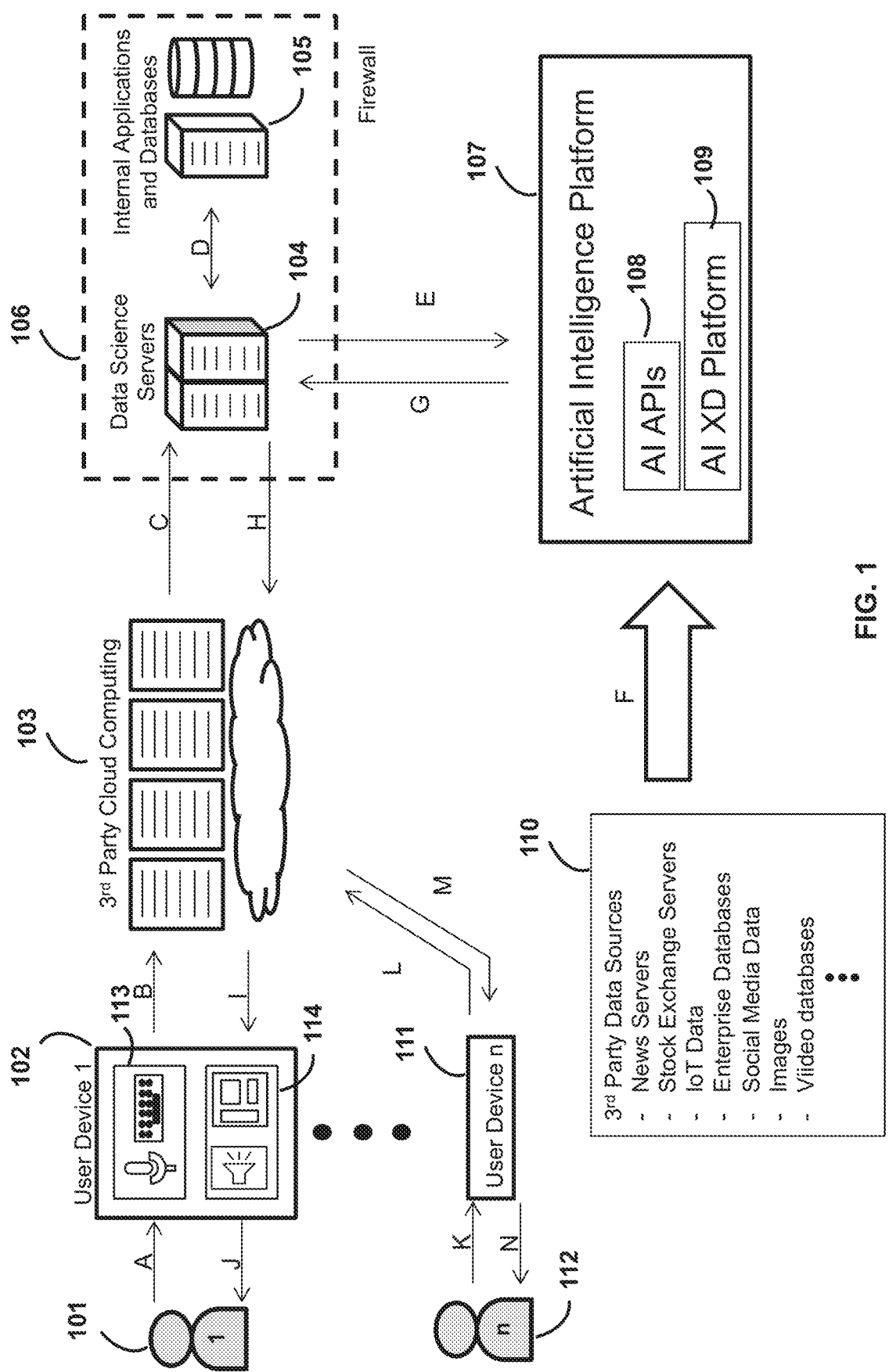
FIG. 1 is a schematic diagram of an example computing architecture for ingesting user data via user devices, and providing big data computations and machine learning using a data enablement platform.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It is herein recognized that it is desirable to process data to provide relevant or meaningful results. It is recognized that there are also many technical challenges of existing computing systems.

In particular, it is herein recognized that typical computing architectures and software programs for information systems are limited to ingest limited types of data and usually from a small number of data sources. Typically, these types of data are based on internal databases. However, it is herein recognized that there are many more types of data, and from different data sources, that can be used and processed to provide interesting data to a person. It is recognized that utilizing extreme data could potentially provide more relevant data. For example, it is recognized that data sources can include, but are not limited to, any one or more of: data from IoT devices, various newspaper servers, various enterprise software systems, various television channels, various radio networks, various magazine servers, social data networks and related platforms, internal databases, data obtained via individual user devices, stock exchange platforms, blogs, third-party search engines, etc. From these example sources, it is appreciated that the types of data are varied and that the data can be constantly updating.

It is also recognized that typical information systems are not technically suited to process extreme data effectively, or, in other words, are designed to typically to process data from a select few sources of data. One of the technical challenges of processing extreme data include being able to process many different types of data and in realtime, or near realtime. Another technical challenge is that storing and organizing the extreme data requires vast memory resources and processing resources (e.g. both hardware and software).

Furthermore, it is herein recognized that the possession of extreme data in itself does not provide relevant or meaningful information, which is the purpose of an information system. It is herein recognized that it is difficult to identify meaningful data from the obtained extreme data. The technical challenge is further complicated when different users wish to obtain different meaningful information from the information system. For example, a first user wishes to use the information system to obtain meaningful information about a first thing, or feature, or person, or concept, etc., while a second user tries to use the same information system to obtain meaningful information about a second thing, or feature, or person, or concept, etc. The more divergent the types of information being sought out by the first user and the second user, the more technically challenging it is to build an effective information system to accommodate these types of information. As a result, currently, many organizations use and rely on many different information systems, with each information system typically focused on one or two types of information. The technical challenge to build an information system further grows in difficulty with a very large number of users.

It is herein recognized that, not only are current computing architectures insufficient to process extreme data, current front-end computing systems (e.g. user interface software and devices) are also limited. For example, in many current information systems, a user typically types in text data into predefined fields, such as via a physical keyboard or a touchscreen keypad. These predefined input fields and input GUIs are processed using more typical computing software. It is herein recognized that such an approach inherently ignores utilizing the variety and the volume of data that is available for various data sources, which likely have data types and data formats that do not conform to the predefined input forms and input GUIs.

It is herein recognized that people often think, talk and act in non-predefined patterns. In other words, the thought process of a person, or a conversation between people, does not typically follow predefined GUIs and predefined input forms. Using existing GUIs, a person will need to extract their notes from a conversation and input the extracted portions of information into the predefined GUIs and input forms. This process is even more burdensome and complex when many people have a meeting, and a person must identify the relevant information to type into a predefined GUI or predefined input forms. Not only is this data entry process inefficient, but the technology inherently ignores other data from the individual's thoughts, or the conversations, or the meetings, or combinations thereof. In other words, current information technologies do not recognize the value of the user behavior. Nor do current information technologies collect data relating to user behavior, process the same, and apply the understood behaviors to the overall information system.

Furthermore, it is herein recognized that using current search interfaces for users, people need to spend time and mental effort to input correct search terms into the predefined GUIs provided by the information systems, analyze the results, and to make a decision about the analyzed results. It is herein recognized that information systems would be more effective if they could provide a user with the answer or answers to a user's question.

Therefore, computing architectures, computing functionalities and devices are described herein to address one or more of the above technical challenges.

In an example embodiment, a computing system is provided that includes a data enablement platform that comprises multiple computing machines that are in communication with each other over a data network. The computing system also include a user device that includes a user interface to receive user input to generate a command card. Associated with the command card includes data representing a directive, multiple search bots, multiple behavior bots, a memory module, and a user interface module. The multiple search bots reside on the data enablement platform. Each one of the search bots search for data specific to the same directive of the command card, but each search bot is also specific to a different data source. In other words, a first search bot searches a first data source and a second search bot searches a second data source. The search bots use a distributed streaming analytics computing platform to process the data from their respective data sources. The first search bot, for example, uses a different set of computations to process the data from the first data source, compared to the second search bot associated with the second data source. The results from the search bots are then processed by the behavior bots.

The behavior bots also reside on the data enablement platform and interact with the user interface module of the command card. The behavior bots receive user interaction data from the user interface module, and process the same using data science and machine learning, to identify different behavior attributes. The behavior bots process the results outputted by the search bots to produce personalized data results. For example, the behavior bots filter the results outputted by the search bots to reflect the behavior attributes. In another example, either in addition or in alternative, the behavior bots transform the results outputted by the search bots to reflect the behavior attributes.

In an example aspect, the behavior bots include artificial constraints that reflect the behavior attributes of the user. For example, a user has a do-it-yourself personality, which is captured by the user's behavior bot. When the search bots search for furniture (e.g. a directive provided by the user), then the behavior bot automatically surfaces results with furniture that has a do-it-yourself aspect (e.g. assembly is required, modifications can be made to the furniture, the furniture looks hand-crafted, etc.).

In another example aspect, the behavior bots add data (e.g. meta data) that is reflective of the behavior attributes of the user. For example, a user has an affinity to cars, which is captured by the user's behavior bot. The search bots search for relationship advice (e.g. dating, marriage, etc.) according a directive provided by the user, and the search bots obtain relationship advice. The behavior bot automatically adds and combines car analogies and other data (e.g. images of cars, video clips of cars) with the relationship advice data. In this way, the user can more comfortably understand the relationship advice data as it has been augmented by car analogies and other car-related data.

In another example aspect, the behavior bots augment the data in a way that is reflective of the behavior attributes of the user. For example, a user is risk adverse, which is captured by the user's behavior bot. The search bots search for vacation destinations according to a directive by the user, and the search bots identify several vacation locations that meet the user's setout criteria (e.g. general location, budget, beach, etc.). The user's behavior bot automatically identifies potential risks and safety measures associated with each vacation location and ranks the vacation locations from least risky to most risky. For example, the behavior bot identifies the number and severity of risks, such as war, theft, civil unrest, health risk, natural disaster risk (e.g. volcano, hurricane, fire, etc.), that are associated with the different vacation locations and accordingly ranks the vacation locations. In another example aspect, the behavior bot identifies the risks and the safety measures to be taken to counter the risks (e.g. travel vaccines, travel routes, etc.).

In another example embodiment, the behavior bots augment the presentation of the data in a way that is reflective of the behavior attributes of the user. For example, if the behavior bot detects that a user has a sad mood, then the behavior bot reads aloud (e.g. play an audio file) of a news article in a cheerful voice. For example, if the behavior bot detects that a user has a busy or concentrated mood, then the behavior bot reads aloud (e.g. play an audio file) of a news article in a fast-paced and neutral voice.

It can be appreciated that the behavior bots can modify the search data in various ways to reflect the behaviors of a user.

The results are outputted by the behavior bots are stored in association with the command card and are outputted to the user. In an example embodiment, a summarization of the results outputted by the behavior bots are stored in association with the command card with data links to various data sources, which were obtained by the search bots. The data enablement platform includes a data lake that stores this information.

The results outputted by the behavior bots are presented to the user via a user interface. As the user interacts with the user interface, the behavior bots receive data reflecting the user behavior. The behavior bots use this data to repeatedly update parameters used in the data science and machine learning computations, or to automatically select new data science algorithms or machine learning algorithms, or a combination thereof.

It is herein recognized that meaningful data for a person is subjective and reflective of the person's behavior. Furthermore, a person makes or draws relationships and conclusions between two different ideas (e.g. two different topics, two different data sets, etc.) that tends to be reflective of their behavior. The term behavior herein includes a person's habits, emotions, opinions, personality, desires, thoughts, pre-conceived notions, biases, perspectives, etc. Different behavior bots capture different aspects of a person's behavior (e.g. by capturing baseline data of a person, by making assumptions, by using look-alike algorithms, etc.) and take into account the person's behavioral attributes when conducting searches for relevant data. In an example aspect, this leads to finding and providing more meaningful data from the perspective of the person.

The behavior bots detect and infer behavioral attributes of a person. In some aspects, a person has difficulty realizing or identifying their own behavioral attributes, but the behavior bots are able to use data collected over a period of time about the person and data collected from others to identify those behavioral attributes.

In another example aspect, the combination of behavior bots and search bots allows for a person's directive to obtain relevant and personalized answers to be scaled. In other words, the behavior bots and search bots can be used to search and process many different types of data for many different topics, and from many data sources, while still taking into account the person's behavior.

In a further example aspect, the behavior bots are transferrable. For example, a given behavior bot used in a search for a first topic can also be used in a search for a second topic. The second topic could be unrelated to the first topic, for example. In another example, a given behavior bot associated with a first person is transferred to a second person, so that the second person's data searching and processing takes on the same behavioral qualities as the first person's data searching and processing.

In an example embodiment, a user interface presents multiple command cards, each associated with a different directive. Each command card is associated with the multiple search bots and the multiple behavior bots, which are specific to the directive of the command card.

It will be appreciated that the term "bot" is known in computing machinery and intelligence to mean a software robot or a software agent. The bots described herein, such as the search bots and the behavior bots, have artificial intelligence.

It will also be appreciated that a user can interact with the user interface in various ways, including without limitation: using oral language, visually, using gestures, using facial expressions, by typing, by using selections presented in a GUI, by using brain signals, by using muscle signals, by using nerve signals, or a combination thereof.

In an example embodiment, an oral communication user device (e.g. a device that includes a microphone) records oral information from a user (e.g. the user's word and sounds) to interact with a data enablement system. The data enablement system processes the voice data to extract, at least the words and of the spoken language, and accordingly processes the data using artificial intelligence computing software and data science algorithms. The data obtained from the oral communication device is processed in combination with, or comparison with, or both, internal data specific to an organization and external data. The computing architecture, via the multiple search bots, ingests data from external data sources or internal data sources, or both, to provide real-time outputs or near real-time data outputs, or both. The data outputs are presented to the user as audio feedback, or visual feedback, or both. Other types of user feedback may be used, including tactile feedback. Other machine actions may be initiated or executed based on the data outputs.

In another example embodiment, the oral communication device is a wearable technology that tracks a user's movement. Currently known and future known wearable devices are applicable to the principles described herein. In another example embodiment, the oral communication device is part of a virtual reality system or augmented reality system, or both. In other words, the display of visual data is immersive and the user can interact with the visual data using oral statements and questions, or using physical movement, or using facial expressions, or a combination thereof.

Turning to FIG. 1, a user device 102 interacts with a user 101. The user, for example, is a consumer user, a business user, a user in the sales industry, a user in the manufacturing industry, etc. The user device 102 includes, amongst other things, input devices 113 and output devices 114. The input devices include, for example, a microphone and keyboard (e.g. physical keyboard or touchscreen keyboard, or both). Other types of input devices include brain signal sensors, nerve signal sensors or muscle signal sensors, or a combination thereof, which can be used to detect the speech, thoughts or intentions (or a combination thereof) of the user. The output devices include, for example, an audio speaker and a display screen. Non-limiting examples of user devices include a mobile phone, a smart phone, a tablet, smart watches, headsets that provide augmented reality or virtual reality or both, a desktop computer, a laptop, an e-book, a wearable device, and an in-car computer interface. In another example, a system of user devices is provided to generate a visually immersive user interface, so that a person's voice is being recorded, and their gestures and motions are being tracked to interact with the data. The user device, or user devices, are in communication with a $3^{rd}$ party cloud computing service 103, which typically includes banks of server machines. Multiple user devices 111, which correspond to multiple users 112, can communicate with the $3^{rd}$ part cloud computing service 103.

The cloud computing service 103 is in data communication with one or more data science server machines 104. These one or more data science server machines are in communication with internal application and databases 105, which can reside on separate server machines, or, in another example embodiment, on the data science server machines. In an example embodiment, the data science computations executed by the data science servers and the internal applications and the internal databases are considered proprietary to given organization or company, and therefore are protected by a firewall 106. Currently known firewall hardware and software systems, as well as future known firewall systems can be used.

The data science server machines, also called data science servers, 104 are in communication with an artificial intelligence (AI) platform 107. The AI platform 107 includes one or more AI application programming interfaces (APIs) 108 and an AI extreme data (XD) platform 109. As will be discussed later, the AI platform runs different types of machine learning algorithms suited for different functions, and these algorithms can be utilized and accessed by the data science servers 104 via an AI API.

The AI platform also is connected to various data sources 110, which may be $3^{rd}$ party data sources or internal data sources, or both. Non-limiting examples of these various data sources include: news servers, radio networks, television channel networks, magazine servers, stock exchange servers, IoT data, enterprise databases, social media data, media databases, etc. In an example embodiment, the AI XD platform 109 ingests and processes the different types of data from the various data sources.

In an example embodiment, the network of the servers 103, 104, 105, 106, 107 and optionally 110 make up a data enablement system. The data enablement system provides relevant to data to the user devices, amongst other things. In an example embodiment, all of the servers 103, 104, 105, 106 and 107 reside on cloud servers.

An example of operations is provided with respect to FIG. 1, using the alphabetic references. At operation A, the user device 102 receives input from the user 101. For example, the user is speaking and the user device records the audio data (e.g. voice data) from the user. The user could be providing a command or a query to the data enablement system, which is used to generate a directive of a command card. The user could also use the user device to make an audio recording or to capture images, or both, for memorializing thoughts to himself or herself, or providing himself or herself a to-do list to complete in the future. In another example embodiment, the user device includes or is in data communication with one or more sensors that detect brain signals, muscle signals or nerve signals, or a combination thereof, which are used as user input data. For example, the brain signals, muscle signals, or nerve signals, or a combination thereof, are processed to generate speech data of the user. In other words, while many of the examples herein refer to audio data or voice data being the user input data, it will be appreciated that in similar example embodiments, other types of user input data can be used.

In an example embodiment, a data enablement application is activated on the user device and this application is placed into a certain mode, either by the user or autonomously according to certain conditions. For example, this certain mode is specific to a given command card. For example, if a user is associated with a first command card, a second command card, a third command card, and so forth, then the user's selection of the second command card places the data enablement application into the mode of the second command card.

At operation B, the user device transmits the recorded audio data to the $3^{rd}$ party cloud computing servers 103. In an example embodiment, the user device also transmits other data to the servers 103, such as contextual data (e.g. time that the message was recorded, information about the user, the mode of the data enablement application during which the message was recorded, etc.). These servers 103 apply machine intelligence, including artificial intelligence, to extract data features from the audio data. These data features include, amongst other things: text, sentiment, emotion, background noise, a command or query, or metadata regarding the storage or usage, or both, of the recorded data, or combinations thereof.

At operation C, the servers 103 send the extracted data features and the contextual data to the data science servers 104. In an example embodiment, the servers 103 also send the original recorded audio data to the data science servers 104 for additional processing.

At operation D, the data science servers 104 interact with the internal applications and databases 105 to process the received data. In particular, the data science servers store and executed one or more various data science algorithms to process the received data (from operation C), which may include processing proprietary data and algorithms obtained from the internal applications and the databases 105.

In alternative, or in addition to operation D, the data science servers 104 interact with the AI platform 107 at operations E and G. In an example embodiment, the data science servers 104 have algorithms that process the received data, and these algorithms transmit information to the AI platform for processing (e.g. operation E). The information transmitted to the AI platform can include: a portion or all of the data received by the data science servers at operation C; data obtained from internal applications and databases at operation D; results obtained by the data science servers from processing the received data at operation C, or processing the received data at operation D, or both; or a combination thereof. In turn, the AI platform 107 processes the data received at operation E, which includes processing the information ingested from various data sources 110 at operation F. Each of the search bots operate on the AI platform 107 and the data science servers 104 to search for and obtain information that is relevant to their given directive. Subsequently, the AI platform 107 returns the results of its AI processing to the data science servers in operation G.

Based on the results received by the data science servers 104 at operation G, the data science servers 104, for example, update its internal applications and databases 105 (operation D) or its own memory and data science algorithms, or both. The data science servers 104 also provide an output of information to the 3$^{rd}$ party cloud computing servers 104 at operation H. This outputted information may be a direct reply to a query initiated by the user at operation A. In another example, either in alternative or in addition, this outputted information may include ancillary information that is either intentionally or unintentionally requested based on the received audio information at operation A. In another example, either in alternative or in addition, this outputted information includes one or more commands that are either intentionally or unintentionally initiated by received audio information at operation A. These one or more commands, for example, affect the operation or the function of the user device 102, or other user devices 111, or IoT devices in communication with the 3$^{rd}$ party cloud computing servers 104, or a combination thereof.

The behavior bots, or portions thereof, reside on the AI platform, or the data science servers, or the 3$^{rd}$ party cloud computing servers, or a combination thereof. Portions of the behavior bots, for example, also reside on user devices, smart devices, phones, edge devices, and IoT devices. In other words, the behavior bots reside on user-interactive devices or devices that are in proximity to user-interactive devices, and are actively monitoring user interaction data. After from the search bots are obtained, the behavior bots process this data to present personalized data to the user.

The 3$^{rd}$ party cloud computing servers 104, for example, takes the data received at operation H and applies transformation to the data, so that the transformed data is suitable for output at the user device 102. For example, the servers 104 receive text data at operation H, and then the servers 104 transform the text data to spoken audio data. This spoken audio data is transmitted to the user device 102 at operation I, and the user device 102 then plays or outputs the audio data to the user at operation J.

This process is repeated for various other users 112 and their user devices 111. For example, another user speaks into another user device at operation K, and this audio data is passed into the data enablement platform at operation L. The audio data is processed, and audio response data is received by the another user device at operation M. This audio response data is played or outputted by the another user device at operation N.

In another example embodiment, the user uses touch-screen gestures, movements, typing, brain signals, muscle signals, nerve signals, etc. to provide inputs into the user device 102 at operation A, either in addition or in alternative to the oral input. In another example embodiment, the user device 102 provides visual information (e.g. text, video, pictures) either in addition or in alternative to the audio feedback at operation J.

Figure 2:
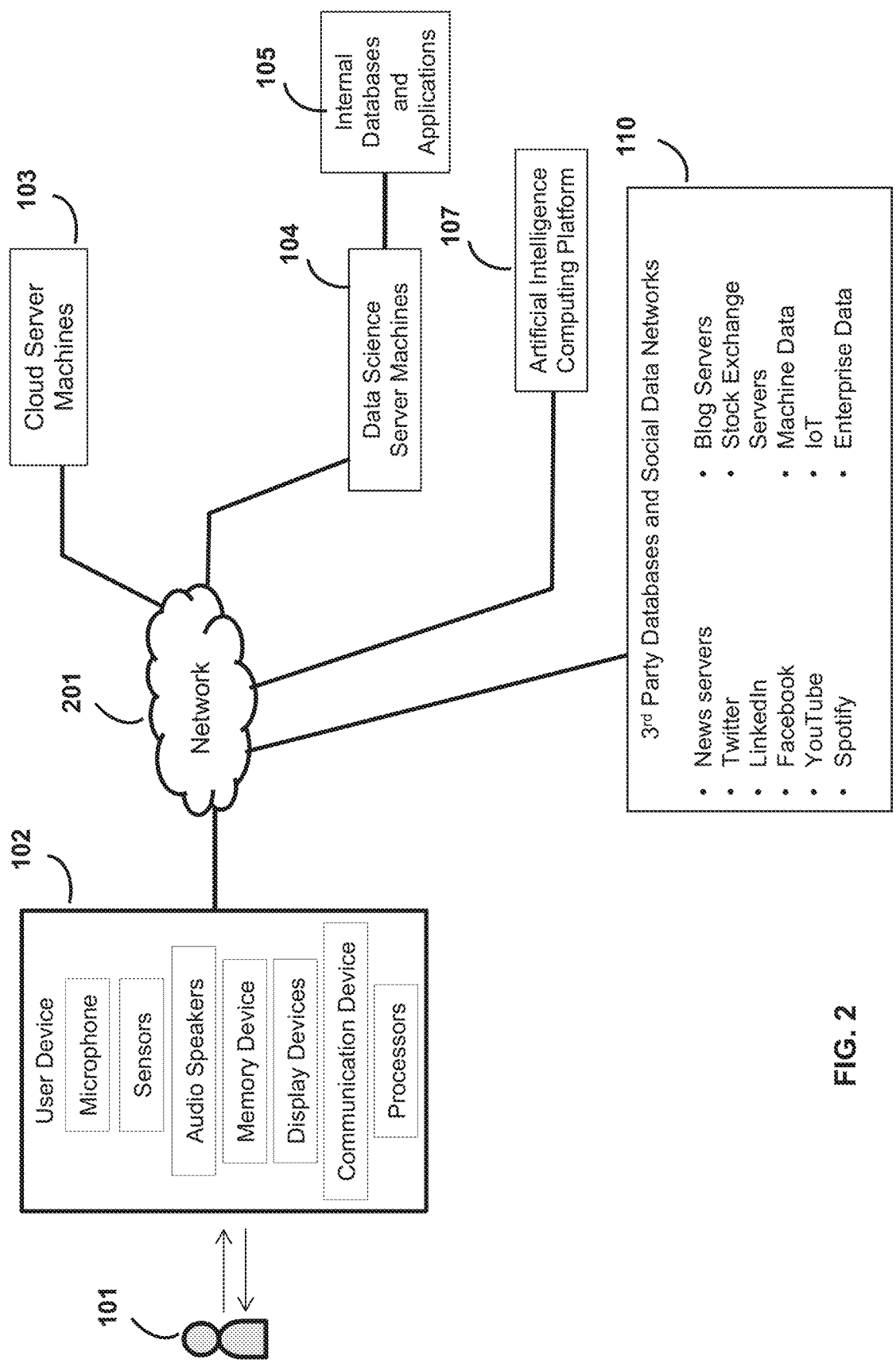
FIG. 2 is another schematic diagram, show another representation of the computing architecture in FIG. 1.

Turning to FIG. 2, another example of the servers and the devices are shown in a different data networking configuration. The user device 102, the cloud computing servers 103, the data science servers 104, AI computing platform 107, and the various data sources 110 are able to transmit and receive data via a network 201, such as the Internet. In an example embodiment, the data science servers 104 and the internal applications and databases 105 are in communication with each other over a private network for enhanced data security. In another example embodiment, the servers 104 and the internal applications and the databases 105 are in communication with each other over the same network 201.

As shown in FIG. 2, example components of the user device 102 include a microphone, one or more other sensors, audio speakers, a memory device, one or more display devices, a communication device, and one or more processors. The user device can also include a global positioning system module to track the user device's location coordinates. This location information can be used to provide contextual data when the user is consuming digital content, or interacting with the digital content (e.g. adding notes, swipe gestures, eye-gaze gestures, voice data, adding images, adding links, sharing content, providing brain signals, providing muscle signals, providing nerve signals, etc.), or both.

In an example embodiment, the user device's memory includes various user interface bots that are part of the data enablement application, which can also reside on the user device. These bots include processing that also resides on the 3$^{rd}$ party cloud computing servers 103. These user interface bots have chat capabilities. Examples of chat bot technologies that can be adapted to the system described herein include, but are not limited to, the trade names Siri, Google Assistant, Alexa, and Cortana. In an example aspect, the bot used herein has various language dictionaries that are focused on various topics. In an example aspect, the bot used herein is configured to understand questions and answers specific to various topics. The user interface bots described herein not limited to chatting capabilities, but can also include functionality and artificial intelligence for controlling visual display of information (e.g. images and video) in combinations with language.

In an example aspect, one or more behavior bots used herein learn the unique voice of the user, which the one or more behavior bots consequently uses to learn behavior that may be specific to the user. This anticipated behavior in turn is used by the data enablement system to anticipate future questions and answers related to a given topic. This identified behavior is also used, for example, to make action recommendations to help the user achieve a result, and these action recommendations are based on the identified behaviors (e.g. identified via machine learning) of higher ranked users having the same topic interest. For example, users can be ranked based on their expertise on a topic, their influence on a topic, their depth of commentary (e.g. private commentary or public commentary, or both) on a topic, the complexity of their bots for a given topic, etc.

In an example aspect, a given behavior bot applies machine learning to identify unique data features in the user voice. Machine learning can include, deep learning. Currently known and future known algorithms for extracting voice features are applicable to the principles described herein. Non-limiting examples of voice data features include one or more of: tone, frequency (e.g. also called timbre), loudness, rate at which a word or phrase is said (e.g. also called tempo), phonetic pronunciation, lexicon (e.g. choice of words), syntax (e.g. choice of sentence structure), articulation (e.g. clarity of pronounciation), rhythm (e.g. patterns of long and short syllables), and melody (e.g. ups and downs in voice). As noted above, these data features can be used identify behaviors and meanings of the user, and to predict the content, behavior and meaning of the user in the future. It will be appreciated that prediction operations in machine learning include computing data values that represent certain predicted features (e.g. related to content, behavior, meaning, action, etc.) with corresponding likelihood values.

The user device may additionally or alternatively receive video data or image data, or both, from the user, and transmit this data via a bot to the data enablement platform. The data enablement platform is therefore configured to apply different types of machine learning to extract data features from different types of received data. For example, the $3^{rd}$ party cloud computing servers use natural language processing (NLP) algorithms or deep neural networks, or both, to process voice and text data. In another example, the $3^{rd}$ party cloud computing servers use machine vision, or deep neural networks, or both, to process video and image data.

Figure 3:
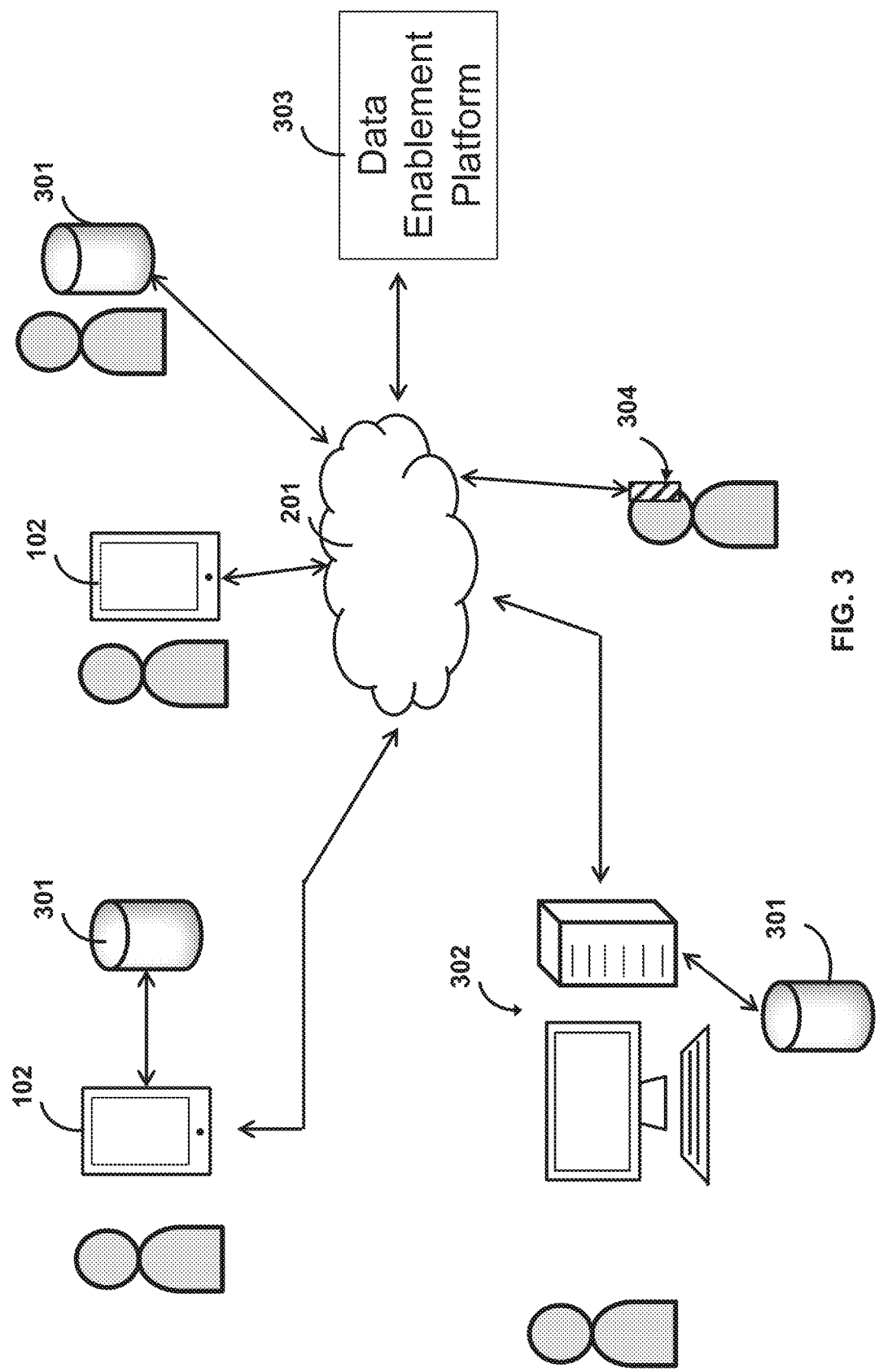
FIG. 3 is a schematic diagram of oral communication devices (OCDs) in communication with respective user devices, which are in turn in communication with the data enablement platform.

Turning to FIG. 3, an example embodiment of an oral communication device (OCD) 301 is shown, which operates in combination with the user device 102 to reduce the amount of computing resources (e.g. hardware and processing resources) that are consumed by the user device 102 to execute the data enablement functions, as described herein. In some cases, the OCD 301 provides better or additional sensors than a user device 102. In some cases, the OCD 301 is equipped with better or additional output devices compared to the user device 102. For example, the OCD includes one or more microphones, one or more cameras, one or more audio speakers, and one or more multimedia projects which can project light onto a surface. The OCD also includes processing devices and memory that can process the sensed data (e.g. voice data, video data, etc.) and process data that has been outputted by the data enablement platform 303. As noted above, the data enablement platform 303 includes, for example, the servers 103, 104, 105, and 107.

As shown in FIG. 3, the OCD 301 is in data communication with the user device via a wireless or wired data link. In an example embodiment, the user device 102 and the OCD 301 are in data communication using a Bluetooth protocol. The user device 102 is in data communication with the network 201, which is in turn in communication with the data enablement platform 303. In operation, when a user speaks or takes video, the OCD 301 records the audio data or visual data, or both. The OCD 301, for example, also pre-processes the recorded data, for example, to extract data features. The pre-processing of the recorded data may include, either in addition or in the alternative, data compression. This processed data or the original data, or both, are transmitted to the user device 102, and the user device transmits this data to the data enablement platform 303, via the network 201. The user device 102 may also transmit contextual data along with the data obtained or produced by the OCD 301. This contextual data can be generated by the data enablement application running on the user device 102, or by the OCD 301.

Outputs from the data enablement platform 303 are sent to the user device 102, which then may or may not transmit the outputs to the OCD 301. For example, certain visual data can be displayed directly on the display screen of the user device 102. In another example embodiment, the OCD receives the inputs from the user device and provides the user feedback (e.g. plays audio data via the speakers, displays visual data via built-in display screens or built-in media projectors, etc.).

In an example embodiment, the OCD 301 is in data connection with the user device 102, and the OCD 301 itself has a direct connection to the network 201 to communicate with the data enablement platform 303. In another example, the user uses the user device 102 to interact with the data enablement platform without the OCD.

In an example embodiment, a different example of a silent OCD 304 is used to record the language inputs of the user. The silent OCD 304 includes sensors that detects other user inputs, but which are not the voice. Examples of sensors in the silent OCD 304 include one or more of: brain signal sensors, nerve signal sensors, and muscle signal sensors. These sensors detect silent gestures, thoughts, micro movements, etc., which are translated to language (e.g. text data). In an example embodiment, these sensors include electrodes that touch parts of the face or head of the user. In other words, the user can provide language inputs without having to speaking into a microphone. The silent OCD 304, for example, is a wearable device that is worn on the head of the user. The silent OCD 304 is also sometimes called a silent speech interface or a brain computer interface. The silent OCD 304, for example, allows a user to interact with their device in a private manner while in a group setting (see FIG. 4A) or in public.

Similar functionality is applicable to the other instance of the OCD 301 that is in data communication with the desktop computer 302. In particular, it is herein recognized that many existing computing devices and user devices are not equipped with sensors of sufficient quality, nor with processing hardware equipped to efficiently and effectively extract the features from the sensed data. Therefore, the OCD 301 supplements and augments the hardware and processing capabilities of these computing devices and user devices.

Figure 4A:
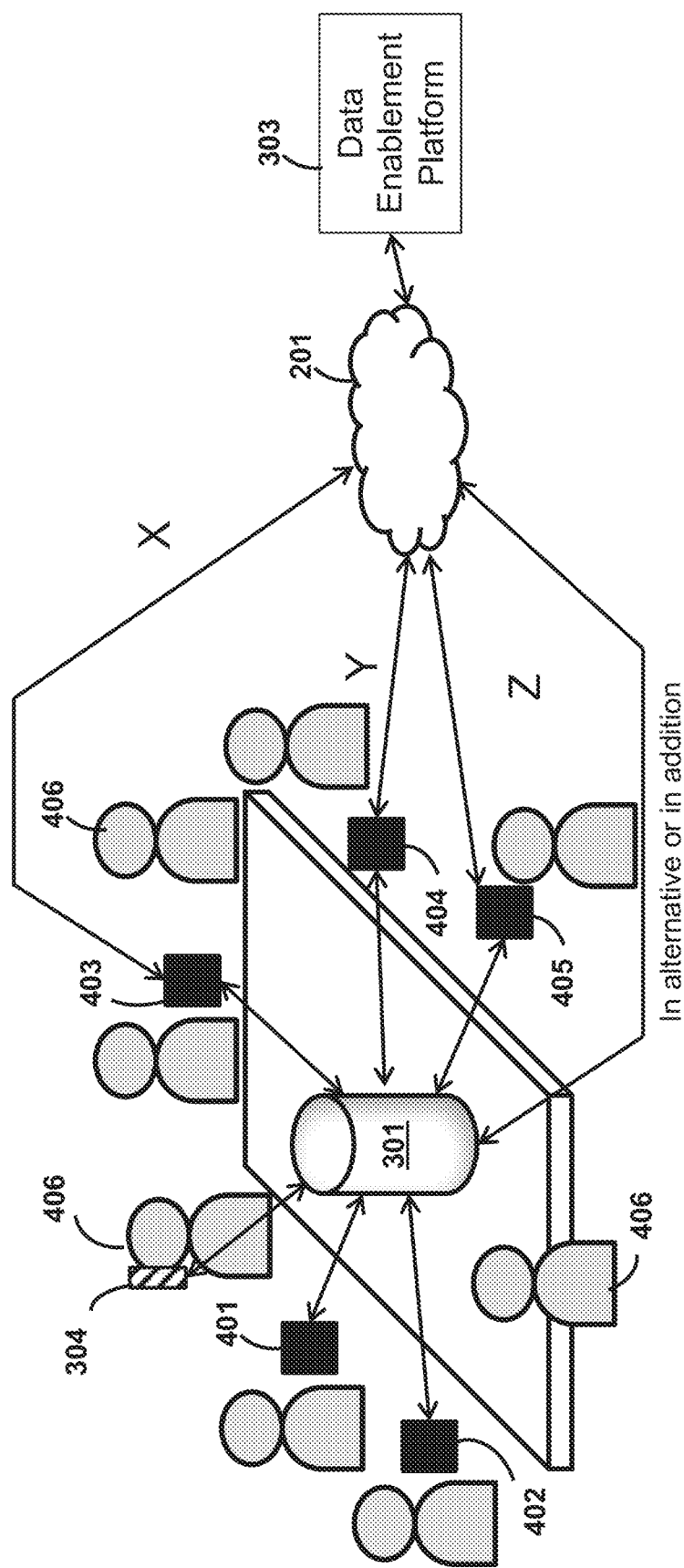
FIG. 4A is a schematic diagram showing an OCD being used in a meeting and showing the data connections between various devices and the data enablement platform.

Turning to FIG. 4A, the OCD 301 is shown being used in a meeting with various people, each having their own respective user devices 401, 402, 403, 404, 405, 304. As noted above, the types of user device can be various (e.g. wearable technology, headsets with virtual reality and/or augmented reality capabilities, smart phones, tablets, laptops, etc.). The OCD can also be used to record data (e.g. audio data, visual data, etc.) and provide data to people 406 that do not have their own user device. The OCD records the oral conversation of the meeting to, for example, take meeting notes. In another aspect, the OCD also links to the user devices to give them information, for example, in real-time about the topics being discussed during the meeting. The OCD also reduces the computing resources (e.g. hardware and processing resources) on the individual user devices.

In an example embodiment, the user 406 wears a silent OCD 304 to privately interact using with the OCD 301. For example, the user's brain signals, nerve signals, muscle signals, or a combination thereof, are captured are synthesized into speech. In this way, the user 406 can at times give private or silent notes, commands, queries, etc. to the OCD 301, and at other times, provide public notes, commands, queries, etc. to the OCD 301 that are heard by the other users in the meeting.

In an example embodiment, the user devices 401, 402, 403, 404, 405, 304 are in data communication with the OCD 301 via a wireless connection, or a wired connection. In an example embodiment, some of the user devices 401, 402 do not have Internet access, but other user devices 403, 404, 405 do have Internet access over separate data connections X, Y and Z. Therefore, the OCD 301 uses one or more of these data connections X, Y and Z to transmit and receive data from the data enablement platform 303.

The OCD may use different communication routes based on the available bandwidth, which may be dictated by the user devices.

For example, the OCD parses a set of data to be transmitted to the data enablement platform into three separate data threads, and transmits these threads respectively to the user devices 403, 404 and 405. In turn, these data threads are transmitted by the user devices over the respective data connections X, Y and Z to the data enablement platform 303, which reconstitute the data from the separate threads into the original set of data.

Alternatively, the OCD uses just one of the data connections (e.g. X) and therefore funnels the data through the user device 403.

In another example embodiment, the OCD designates the data connections X and Y, corresponding to the user deices 403 and 404, for transmitting data to the data enablement platform 303. The OCD designates the data connection Z, corresponding to the user device 405, for receiving data from the data enablement platform 303.

The data obtained by the OCD, either originating from a user device or the data enablement platform, can be distributed amongst the user devices that are in communication with the OCD. The OCD can also provide central user feedback (e.g. audio data, visual data, etc.) to the users in the immediate vicinity.

It will be appreciated that the OCD therefore acts as a local central input and output device. In another example aspect, the OCD also acts as a local central processing device to process the sensed data, or processed the data from the data enablement platform, or both. In another example aspect, OCD also acts as a local central communication hub.

In an example embodiment, the OCD, either in the alternative or in addition, the OCD has its own network communication device and transmits and receives data, via the network 201, with the data enablement platform 303.

The OCD provides various functions in combination with the data enablement platform 303. In an example operation, the OCD provides an audio output that orally communicates the topic of a discussion. In an example operation, the OCD records the discussion items that are spoken during a conversation, and automatically creates text containing meeting minutes. In an example operation, the OCD monitors the flow of the discussion and the current time, and at appropriate times (e.g. pauses, hard stops, end of sentences, etc.) interjects to provide audio feedback about related topics. For example, the OCD monitors topics and concepts being discussed and, in real-time, distributes ancillary and related data intelligence to the user devices. In an example operation, the OCD monitors topics and concepts being discussed and, in real-time, determines if pertinent related news or facts are to be shared and, if so, interjects the conversation by providing audio or visual output that provides the pertinent related news or facts. In another example operation, the OCD monitors topics and concepts being discussed and, in real-time, determines if a user provided incorrect information and, if so, interjects the conversation by providing audio or visual output that provides the correct information. In another example operation, the OCD provides different feedback to different user devices, to suit the interests and goals specific the different users, during the conversation between users. In another example operation, the OCD uses cameras and microphones to record data to determine the emotion and sentiment of various users, which helps to inform: which content should be published to certain users; the order or format, or both, of the presentation of the content; and the generation of new content. In another example operation, each of the users can use their user devices in parallel to interact with the OCD or the data enablement platform, or both, to conduct their own research or make private notes (or both) during the conversation. In another example embodiment, the OCD includes one or more media projectors to project light images on surrounding surfaces.

It will be appreciated that while the housing body of the OCD is shown to be cylindrical, in other example embodiments, it has different shapes.

Turning to FIG. 4B, users in Location A are interacting with one or more OCDs, and a user in a separate location (i.e. Location B) is interacting with another OCD. Together, these users, although at different locations can interact with each through digital voice and imagery data. The data enablement platform processes their data inputs, which can include voice data, image data, physical gestures and physical movements. These data inputs are then used to by the data enablement platform to provide feedback to the users.

At Location A, two OCD units 301 are in data communication with each other and project light image areas 411, 410, 409, 408. These projected light image areas are positioned in a continuous fashion to provide, in effect, a single large projected light image area that can surround or arc around the users. This produces an augmented reality or virtual reality room. For example, one OCD unit projects light image areas 411 and 410, and another OCD unit projects light image areas 409 and 408.

Also at Location A is a user 407 that is wearing another embodiment of an OCD 301a. This embodiment of the OCD 301a includes a microphone, audio speakers, a processor, a communication device, and other electronic devices to track gestures and movement of the user. For example, these electronic devices include one or more of a gyroscope, an accelerometer, and a magnetometer. These types of devices are all inertial measurement units, or sensors. However, other types of gesture and movement tracking can be used. In an example embodiment, the OCD 301a is trackable using triangulation computed from radio energy signals from the two OCD units 301 positioned at different locations (but both within Location A). In another example, image tracking from cameras is used track gestures.

The users at Location A can talk and see the user at Location B.

Conversely, the user at Location B is wearing a virtual reality or augmented reality headset, which is another embodiment of an OCD 301*b*, and uses this to talk and see the users at Location A. The OCD embodiment 301*b* projects or displays images near the user's eyes, or onto the user's eyes. The OCD embodiment 301*b* also includes a microphone, audio speaker, processor, and communication device, amongst other electronic components. Using the OCD embodiment 301*b*, the user is able to see the same images being projected onto one or more of the image areas 411, 410, 409, and 408.

Figure 5:
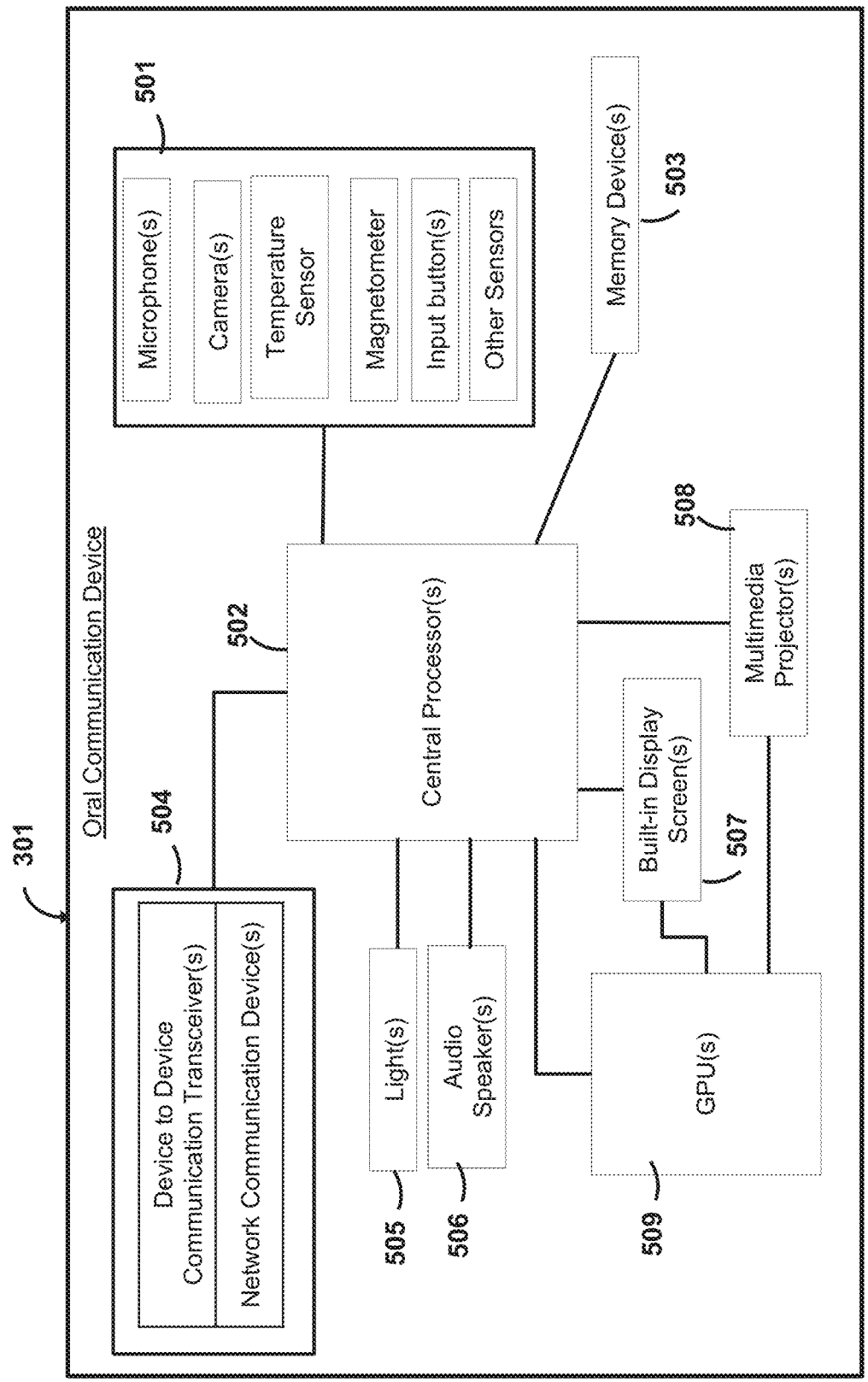
FIG. 5 is a block diagram showing example components of the OCD.

Turning to FIG. 5, example components that are housed within the OCD 301 are shown. The components include one or more central processors 502 that exchange data with various other devices, such as sensors 501. The sensors include, for example, one or more microphones, one or more cameras, a temperature sensor, a magnetometer, one or more input buttons, and other sensors.

In an example embodiment, there are multiple microphones that are oriented to face in different directions from each other. In this way, the relative direction or relative position of an audio source can be determined. In another example embodiment, there are multiple microphones that are tuned or set to record audio waves at different frequency ranges (e.g. a microphone for a first frequency range, a microphone for a second frequency range, a microphone for a third frequency range, etc.). In this way, more definition of audio data can be recorded across a larger frequency range.

In an example embodiment, there are multiple cameras that are oriented to face in different directions. In this way, the OCD can obtain a 360 degree visual field of view. In another example, one or more cameras have a first field of a view with a first resolution and one or more cameras have a second field of view with a second resolution, where the first field of view is larger than the second field of view and the first resolution is lower than the second resolution. In a further example aspect, the one or more cameras with the second field of view and the second resolution can be mechanically oriented (e.g. pitched, yawed, etc.) while the one or more cameras with the first field of view and the first resolution are fixed. In this way, video and images can be simultaneously taken from a larger perspective (e.g. the surrounding area, people's bodies and their body gestures), and higher resolution video and images can be simultaneously taken for certain areas (e.g. people faces and their facial expressions). It will be appreciated that currently known and future known image processing algorithms and facial expression data libraries that are used to process facial expressions are applicable to the principles described herein.

The OCD also includes one or more memory devices 503, lights 505, one or more audio speakers 506, one or more communication devices 504, one or more built-in-display screens 507, and one or more media projectors 508. The OCD also includes one or more graphics processing units (GPUs) 509. GPUs or other types of multi-threaded processors are configured for executing AI computations, such as neural network computations. The GPUs are also used, for example, to process graphics that are outputted by the multimedia projector(s) or the display screen(s) 507, or both.

In an example embodiment, the communication devices include one or more device-to-device communication transceivers, which can be used to communicate with one or more user devices. For example, the OCD includes a Bluetooth transceiver. In another example aspect, the communication devices include one or more network communication devices that are configured to communicated with the network 201, such as a network card or WiFi transceiver, or both.

In an example embodiment, there are multiple audio speakers 506 positioned on the OCD to face in different directions. In an example embodiment, there are multiple audio speakers that are configured to play sound at different frequency ranges.

In an example embodiment, the built-in display screen forms a curved surface around the OCD housing body. In an example embodiment, there are multiple media projectors that project light in different directions.

In an example embodiment, the OCD is able to locally pre-process voice data, video data, image data, and other data using on-board hardware and machine learning algorithms. This reduces the amount of data being transmitted to the data enablement platform 303, which reduced bandwidth consumption. This also reduces the amount of processing required by the data enablement platform.

Figure 6:
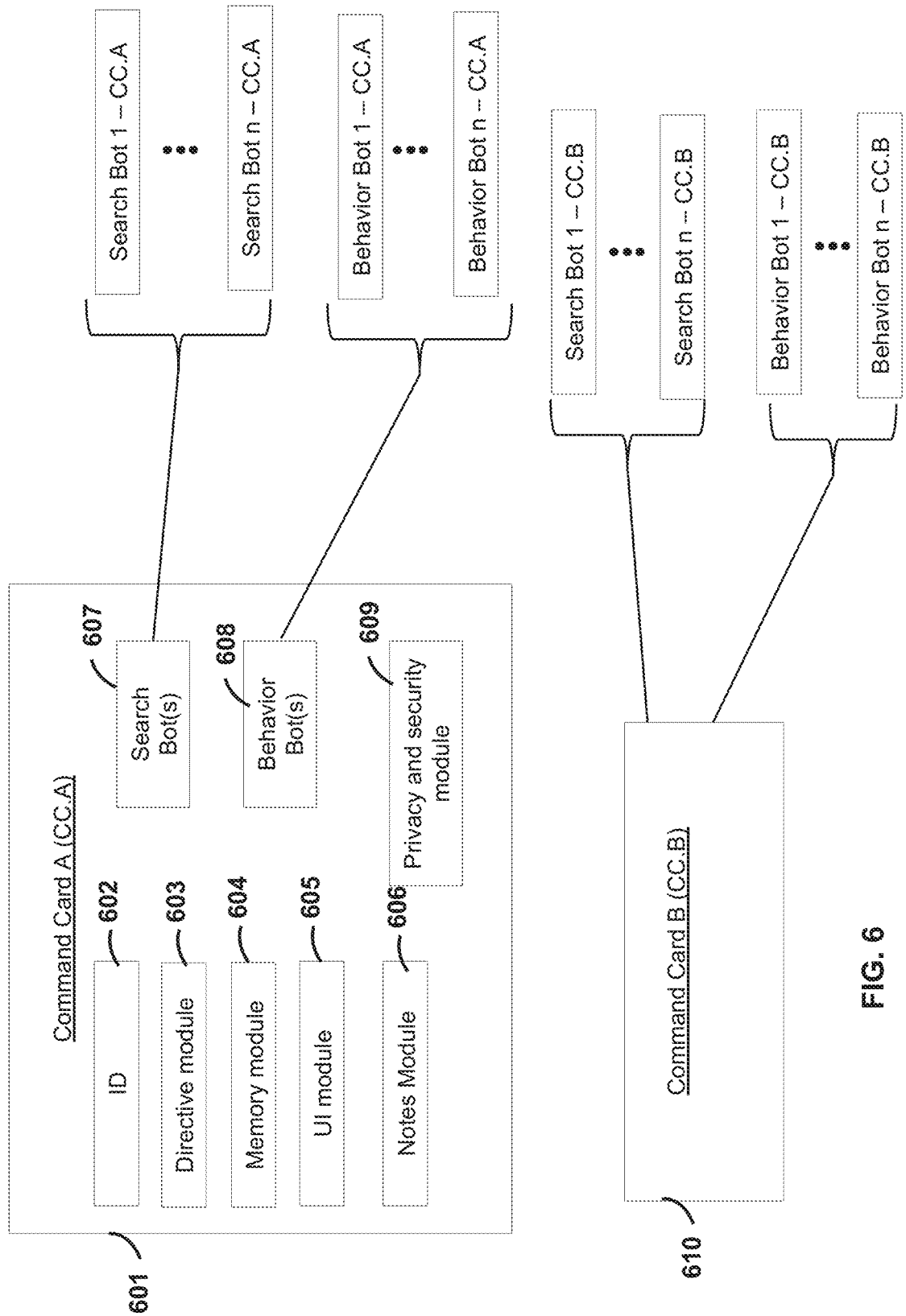
FIG. 6 is a schematic diagram showing an example software architecture for command cards.

Turning to FIG. 6, an example embodiment of computing modules are shown for two command cards. It will be appreciated that a user may initiate the creation of different command cards for different topics or requests.

For example, a user works at a company that sells products. The user may create a first command card by speaking into the user device: "How do I form a relationship with Company A based on the sale of our products?" This is used to form the directive of a Command Card A (e.g. referenced as CC.A in the short form), for example. The same user may type or speak into the user device indicating: "Help me plan my itinerary for my first trip to Japan." This statement provided by the user is used to form the directive of Command Card B (e.g. referenced as CC.B in the short form).

Regarding Command Card A 601, it includes: an ID data tag 602 which uniquely identifies the command card; a directive module 603 that is configured to process user input to identify a directive of the command card 601; a memory module 604, which stores data related to the command card 601; a UI module 605 that includes executable instructions outputting information via one or more user devices, and for receiving user input via one or more user devices; a notes module 606 for obtaining and processing data from a user (e.g. text data, oral data, image data, video data etc.) that is related to the command card 601; one or more search bots 607 for searching for data specific to the directive; one or more behavior bots 608 for monitoring user behavior and for processing the data obtained by the search bots; and a privacy and security module 609 for determining privacy settings related to data or computing functions, or both. For example, a user can keep private or share one or more of the following: resulting data of the command card A 601, the data of the notes module 606, one or more of the search bots themselves, and one or more of the behavior bots themselves.

The search bots of 607 for example, include: Search Bot 1-CC.A and numerous other search bots including Search Bot n-CC.A. Each of these search bots search a different data source to find and process information specific to the directive. It is herein recognized that different types of data require different types of computational processing. For example, photo data, audio data, video data, text data, and machine data, each require different types of processing. The behavior bots 608, or example, include: Behavior Bot 1-CC.A and numerous other behavior bots, including Behavior Bot n-CC.A. Each behavior bot monitors a different behavior of a user, and processes the data accordingly.

For example, one behavior bot monitors facial expressions of a user to determine behavior, while a different behavior bot monitors risk tolerance patterns of the user, and while yet another behavior bot monitors travel patterns of the user.

In an example aspect, the user provides user input via the UI module to modify the directive. In an example embodiment, the detected behaviors of the user by one or more behavior bots, via the UI module, are used to modify the understanding of the directive. For example, the directive module uses data science and machine learning to initially interpret a user's command or query. Over time, as the user interacts with the data, the directive module obtains data from one or more behavior bots to modify one or more parameters in the data science computation or the machine learning computations, or both, to output a second interpretation of the user's command or query. This second interpretation then becomes the new directive of the command card.

The Command Card B (CC.B) 610 has similar data components, modules and bots. However, the directive, the search bots, and the behavior bots, amongst other things are different than those of Command Card A.

It can be appreciated that a user can form many different command cards.

In an example aspect, each command card is a digital container that is specific to a user-defined given topic, or theme, or concept, or query. It contains machine intelligence to search for and provide personally relevant data for the given topic, or concept, or query.

In an example aspect, this digital container is private, personal, and secure. In another aspect, this digital container has credential capability for the command card itself, for various levels of users, and for the bots. This enables individuals to have private containers and answers that only the user can see. This enables groups of people to collaborate and keep the container content and answer private only to that group. This enables employees or people associated with a business or organization to collaborate and keep container content and answers private to that business or organization. This enables varying levels of individual, group, business, or organizations to pick and use only certain global bots, local bots, and user information.

Figure 7:
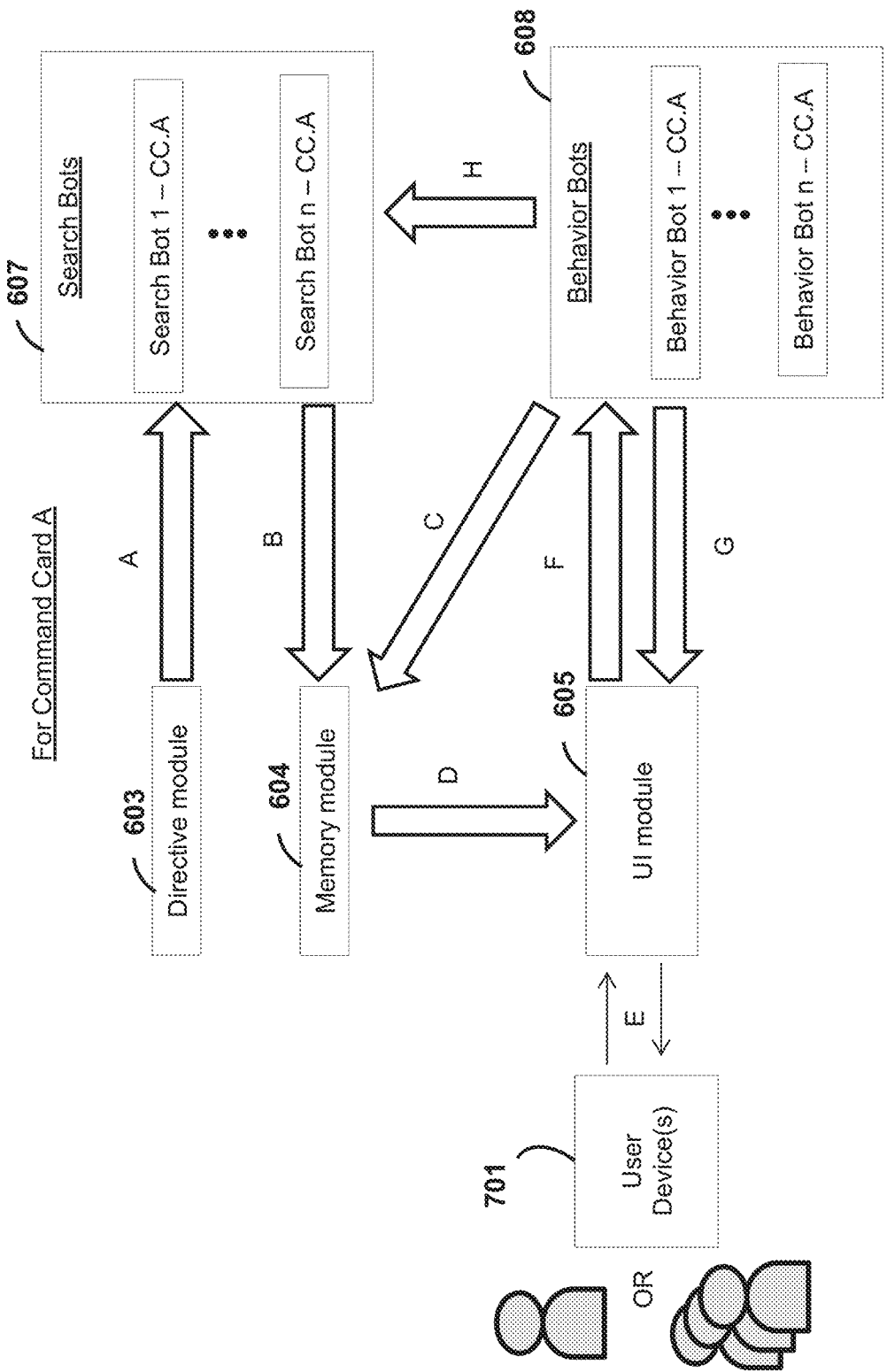
FIG. 7 is a flow diagram showing the example flow of data between the software components of a given command card.

Turning to FIG. 7, an example flow diagram of data between the different components of a command card is shown. The flows between the components or modules are marked with reference letters. In the example shown in FIG. 7, the given Command Card A has been created, for example, based on certain user input.

At operation A, the directive module 603 sends the directive to each and every one of the search bots 607. For example, this can occur when during the provisioning process of each search bot. The search bots then execute their search function of different data sources. Each search bot searches a different source to look for data that is relevant to the directive provided by the directive module.

It can be appreciated that different search bots can use different data protocols to search data. For example, one search bot obtains data using a push protocol, where a given data source pushes the data to the search bot. In another example, a different search bot uses a pull protocol, such as for a web crawler bot. Furthermore, each search bot can be governed by different internal policies. For example, one search bot searches a data source once every 24 hours, while a different search bot searches a different data source once every second. There may be other differences between the search bots. The search bots operate in parallel to each other and repeatedly.

As per operation B, the results obtained by the search bots are temp in a memory module 604 associated with Command Card A. In operation C, the behavior bots 608 filter or process the data obtained by the search bots, or both, and store the filtered data or processed data (or both) in the memory module 604. This filtered data or processed data, or both, is relevant to the behavior of the user. In an example embodiment, the data is filtered and then processed to obtain a summarization of the data; this data along with the data links to the data source are stored in the memory module 604. In an example embodiment, the full or actual data sources of the data links is accessible by the data links, but the full or actual data sources are not stored in the memory module in order to reduce the amount of memory resources (e.g. hardware and software resources).

In operation D, the resulting information is sent to the UI module 605, which then processes the data for outputting to one or more user devices 701 via operation E. The user device or devices 701 could be the OCD 301, or the user device 102, or some other user device or devices that allow one or more people to interact with data. One or more users interact with one more user devices and, as part of operation E, the UI module obtains user interaction data. These interaction data could include, for example and without limitation, voice data, gesture data, text data, image data, facial data, audio data, biometrics data, brain signal data, muscle signal data, nerve signal data, command data (e.g. clicks, swipes, dislike/like input, information regarding sharing of the data, bookmarking of the data, highlighting of the data, etc.), or a combination thereof. The UI module 605 sends this detected user interaction feature data to the behavior bots 608, at operation F.

The behavior bots 608 take this data as input to modify the parameters used in their filtering algorithms, or processing algorithms, or both. In addition or in alternative, a behavior bot may altogether change their filtering algorithm or processing algorithm, or both, based on the user interaction feature data. This feedback in turn affects future iterations of operation C to filter or process the data, or both, that is obtained by the search bots.

For example, if a user shows an acceptance of uncertain information, or shows a willingness to act on information with higher degree of uncertainty, then the user's risk tolerance is considered high. The behavior bot that is specific to risk tolerance then modifies its filter to accept data that has a higher degree of uncertainty, compared to its initial setting of filtering out data with a higher degree of uncertainty.

In another example embodiment, in operation G, one or more of the behavior bots also sends the determined behaviors of the user to the UI module 605. The UI module 605, for example, uses these determined behaviors to modify the presentation of the data to be customized to the behavior of the user.

In another example embodiment, one or more of the behavior bots also send(s) the determined behaviors of the user to the search bots in operation H. The search bots 608, for example, use these determined behaviors to modify parameters of the searching and initial processing of the data to reflect the determined behavior of the user.

Figure 8:
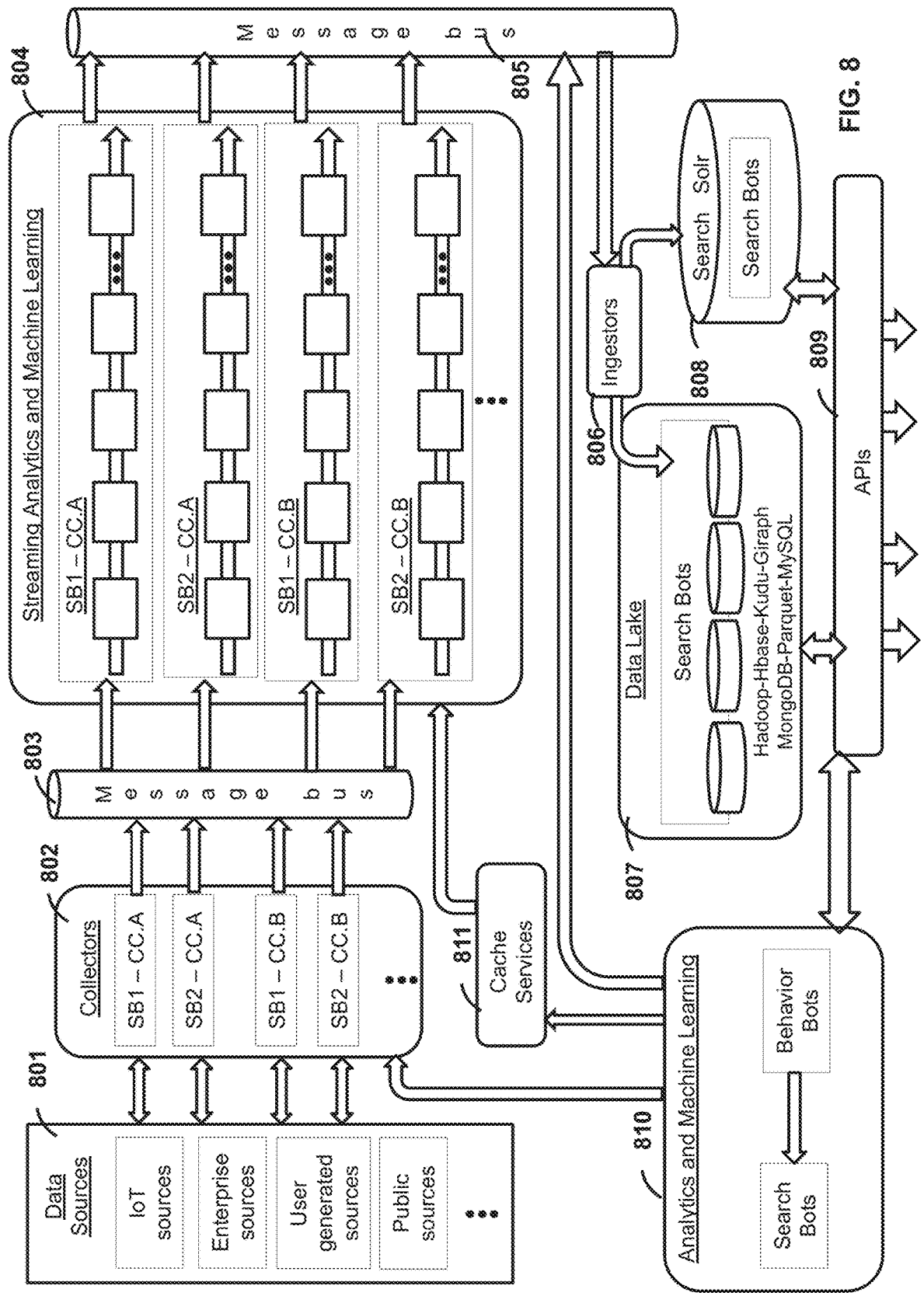
FIGS. 8 and 9 are schematic diagrams showing an example computing architecture for a data enablement platform, which includes supporting parallelized search bots and parallelized behavior bots.
Figure 9:
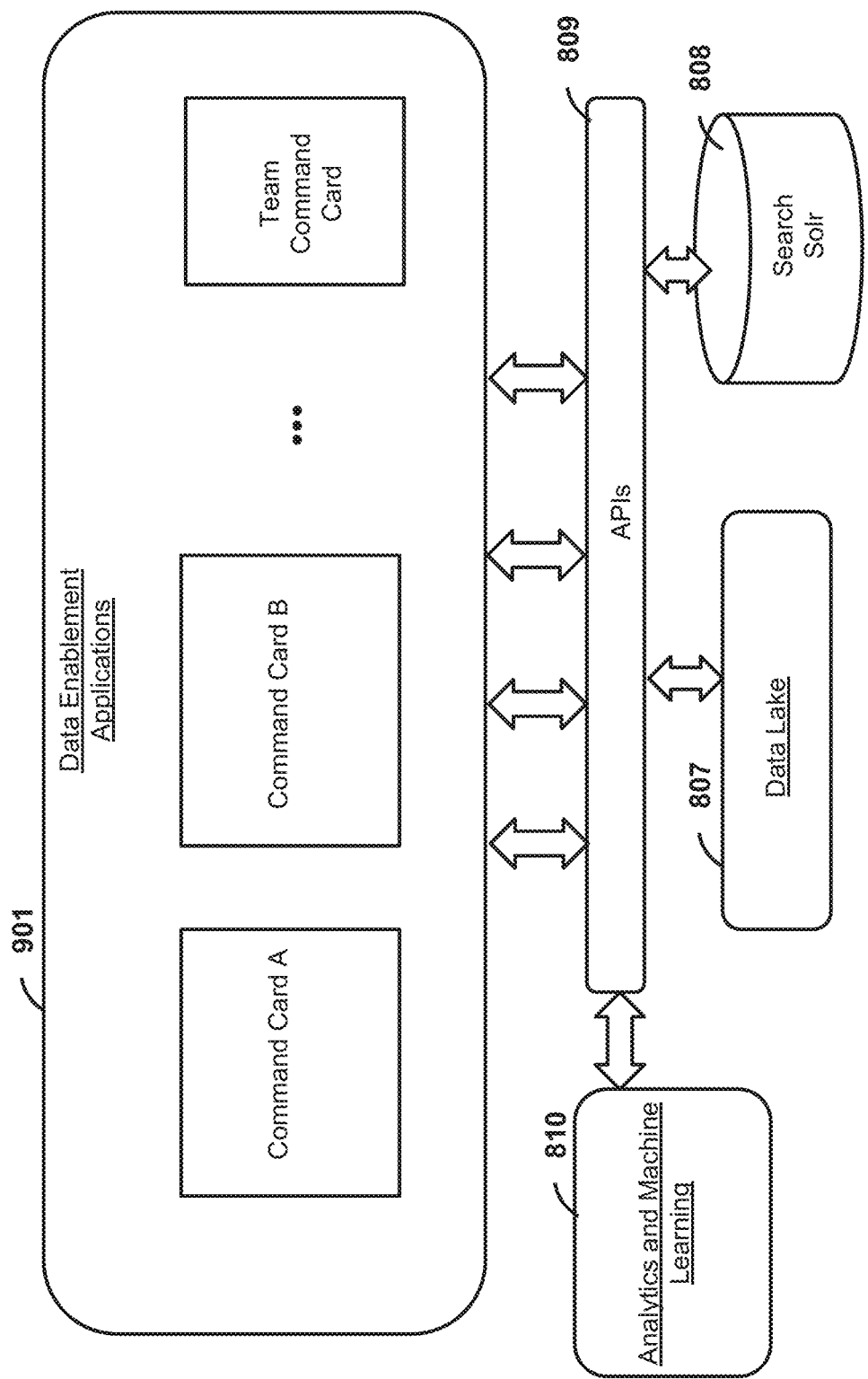

FIGS. 8 and 9 show example computing architectures of the data enablement platform, which can be incorporated into the above computing systems.

Turning to FIG. 8, an example computing architecture is provided for collecting data and performing machine learning on the same. This architecture, for example, is utilized in the AI platform 107 and the data science servers 104.

The architecture in FIG. 8 includes multiple data sources. For example, data sources include those that considered part of any one or more of: the IoT data sources, the enterprise data sources, the user generated data sources, and the public data sources (e.g. public websites and data networks). Non-limiting examples of IoT devices include sensors used to determine the status of products (e.g. quantity of product, current state of product, location of product, etc.). IoT devices can also be used to determine the status of users (e.g. wearable devices). IoT devices can also be used to determine the state of users (e.g. wearable devices), the environment of the user, or sensors that collect data regarding a specific topic. For example, if a person is interested in weather, then IoT sensors could be weather sensors positioned around the world. If a person is interested in smart cities, then IoT sensors could include traffic sensors. Enterprise software can include Customer Relations Management software, Enterprise Resources Planning Software, supply management software, etc. User generated data includes social data networks, messaging applications, email data, text data, blogs, user generated video data, audio blog data, and online forums. Public websites and data networks include government websites and databases, banking organization websites and databases, economic and financial affairs websites and databases. It can be appreciated that other digital data sources may be collected by the search bots. In an example embodiment, one or more the data sources are internal or private to a given person or to a given organization. For example, enterprise data can be internal to a given company and messaging data (e.g. via FaceBook, MSN Messenger, WeChat, WhatsApp, SnapChat, etc.) can be private to a given person.

In particular, each one of the search bots in the data collectors module 802 collect data from a specific data source. For example, Search Bot 1 for Command Card A (SB1-CC.A) searches a first data source to obtain data for the directive in Command Card A, and Search Bot 2 for Command Card A (SB2-CC.A) searches a second data source to obtain data for the same directive in Command Card A. Search Bot 1 for Command Card B (SB1-CC.B) searches a third data source to obtain data for the directive in Command Card B, and Search Bot 2 for Command Card B (SB2-CC.B) searches a fourth data source to obtain data for the same directive in Command Card B.

The first, second, third and fourth data sources are, for example, all different from each other.

In another example, the first and the second data sources are different from each other, and the third and the fourth data sources are different from each other. However, the first data source and the third data source are the same. In other words, two different command cards can have their respective different search bots that search the same data source, but for different directives.

The search bots operate in parallel to generate parallel streams or threads of collected data. The collected data is transmitted via a message bus 803 to a distributed streaming analytics engine 804, which applies various data transforms and machine learning algorithms. For example, for Search Bot 1 for Command Card A (SB1-CC.A), the streaming analytics engine 804 has modules to transform the incoming data, apply language detection, add custom tags to the incoming data, detect trends, and extract objects and meaning from images and video. It will be appreciated that other modules may be incorporated into the SB1-CC.A. Other search bots can have the same streaming analytics modules, or different ones. For example, the streamlining analytics modules of Search Bot 2 for Command Card B (SB2-CC.B) includes generating text data from audio data (e.g. a pod cast or video) using natural language processing and speech-to-text processing, identifying sentiment of the data, and formatting the text data and the sentiment data. It can be appreciated that different data sources can use different reformatting protocols. Each search bot processes its data using streaming analytics in parallel to the other search bots. This continued parallelized processing by the search bots allows for the data enablement platform to process large amounts of data from different data sources in realtime, or near realtime.

In an example implementation, the engine 804 is structured using one or more of the following big data computing approaches: NiFi, Spark and TensorFlow.

NiFi automates and manages the flow of data between systems. More particularly, it is a real-time integrated data logistics platform that manages the flow of data from any source to any location. NiFi is data source agnostic and supports different and distributes sources of different formats, schemas, protocols, speeds and sizes. In an example implementation, NiFi operates within a Java Virtual Machine architecture and includes a flow controller, NiFi extensions, a content repository, a flowfile repository, and a provenance repository.

Spark, also called Apache Spark, is a cluster computing framework for big data. One of the features of Spark is Spark Streaming, which performs streaming analytics. It ingests data in mini batches and performs resilient distributed dataset (RDD) transformations on these mini batches of data.

TensorFlow is software library for machine intelligence developed by Google. It uses neural networks which operate on multiple central processing units (CPUs), GPUs and tensor processing units (TPUs).

Analytics and machine learning modules 810 are also provided to ingest larger volumes of data that have been gathered over a longer period of time (e.g. from the data lake 807). In particular, behavior bots obtain user interaction data to set parameters for filtering or processing algorithms, or to altogether select filtering or processing algorithms from an algorithms library. The behavior bots, for example, use one or more of the following data science module to extract behaviors from the user interaction data: an inference module, a sessionization module, a modeling module, a data mining module, and a deep learning module. These modules can also, for example, be implemented by NiFi, Spark or TensorFlow, or combinations thereof. Unlike these the modules in the streaming analytics engine 804, the analysis done by the modules 810 is not streaming. The behavior bots then filter or process the data, or both, that is outputted from the search bots in the engine 804. In an example embodiment, the behavior bots, not only filter the data, but also process the data to provide understanding and prediction in relation to the directive of a given command card. In other words, the results could include the filtered data, a summary of the filtered data, data links to the original data sources, understanding data (e.g. text, images, video, audio data, etc.) showing how the filtered data is applicable to directive of the given command card, and prediction data that provides predicted events or circumstances that are relevant to the directive of the given command card. These results outputted by the behavior bots are stored in memory (e.g. cache services 811), which are then transmitted to the streaming analytics engine 604.

The results outputted by the streaming analytics engine 804, are transmitted to ingestors 606, via the message bus 805. The outputted data from the analytics and machine learning modules 810 are also transmitted to the ingestors 806 via the message bus 805.

The ingestors 806 organize and store the data into the data lake 807, which comprise massive database frameworks. Non-limiting examples of these database frameworks include Hadoop, HBase, Kudu, Giraph, MongoDB, Parquet and MySQL. The data outputted from the ingestors 806 may also be inputted into a search platform 808. A non-limiting example of the search platform 808 is the Solr search platform built on Apache Lucene. The Solr search platform, for example, provides distributed indexing, load balanced querying, and automated failover and recovery.

The memory modules of the search bots operate are provisioned and stored in the data lake 807 and the Solr search platform 808. For example, all the results data stored in relation to SB1-CC.A is stored in a memory module that is stored in the data lake or is indexed using the Solr search platform, or both. Using this architecture, data relating to different search bots can be obtained from the data lake or the Solr search platform in parallel.

Data from the data lake and the search engine are accessible by API services 809.

Turning to FIG. 9, a continuation of the computing architecture from FIG. 8 is shown, which is used after the data has been stored in the data lake 807 and indexed into the search platform 808.

An analytics and machine learning module 810 obtains data from the search platform 808 and the data lake 807 and applies data science and machine learning services, distributed processing services, data persistence services to the obtained data. For example, the data science and machine learning services are implemented using one or more of the following technologies: NiFi, Spark, TensorFlow, Cloud Vision, Caffe, Kaldi, and Visage. It will be appreciated that other currently known and future known data science or machine learning platforms can be used to execute algorithms to process the data. Non-limiting examples of distributed processing services include NiFi and Spark.

The API layer 809 includes various APIs that interact with the applications 901, including the data enablement applications. The APIs, for example, exchange data with the applications in one or more of the following protocols: HTTP, Web Socket, Notification, and JSON. It will be appreciated that other currently known or future known data protocols can be used.

The data enablement applications include various command cards (e.g. Command Card A and Command Card B) that each have their own directive. A team command card is also provided, which is an application that manages and organizes data from various command cards. The AI XD platform 109 includes, for example, a plurality of intelligent devices, intelligent device message buses, and networks.

In an example aspect, the command card could be an application itself, or a widget that plugs into another application (e.g. Excel, a CRM, an ERP, etc.).

In another aspect, the module 810 is shown in communication with the APIs, but in another example, the module 810 can directly access the data lake and solr search indexer.

Figure 10B:
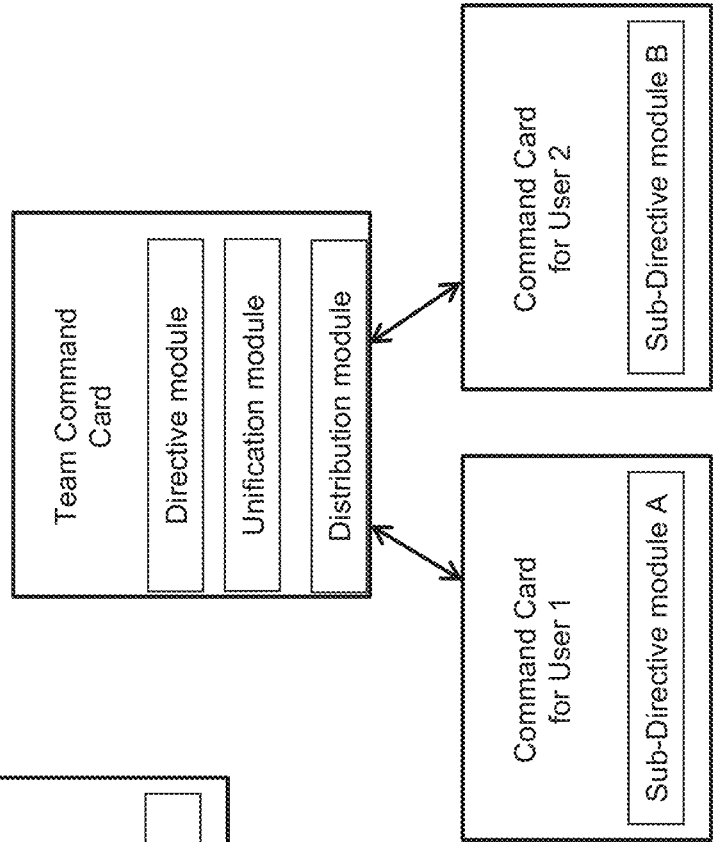
FIGS. 10A and 10B are block diagram showing example software architectures used to coordinate multiple command cards using a team command card.
Figure 10A:
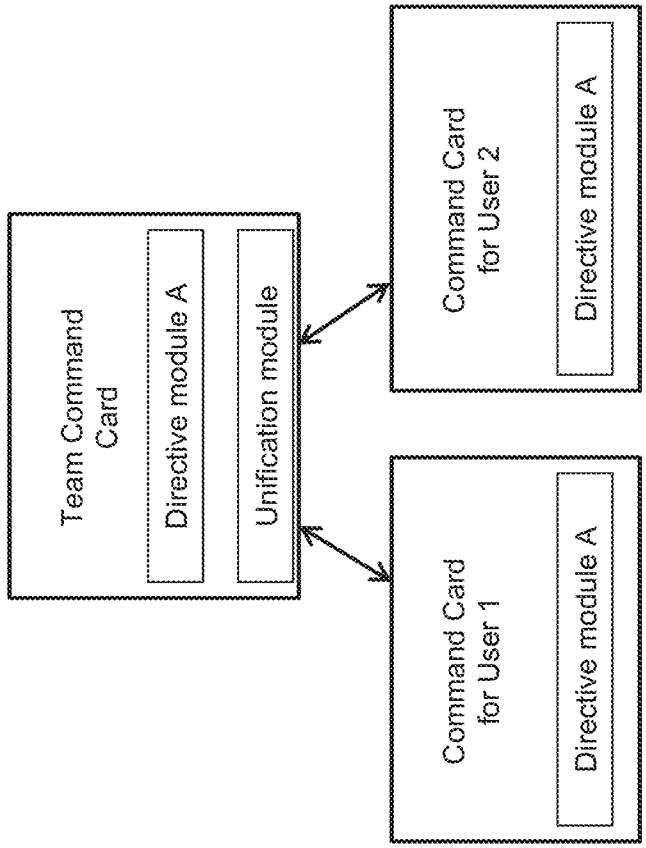

Turning to FIGS. 10A and 10B, examples of team command cards are provided.

In FIG. 10A, the team command card is associated with a command card for user and a command card for user 2. The team command card and these associated command cards all have the same directive module A. However, other attributes about the command cards may be different, such as the search bots and the behavior bots assigned to each of the command cards. The different data obtained by the command cards for the users are sent to the team command card. The team command card uses its unification module to combine the data from the command cards for the users, which includes identify and deleting duplicate data. In other words, using this architecture, different command cards are used to obtain data from different sources, and being personalized to different users. These different data with different personalizations are combined with the team command card.

In FIG. 10B, the team command card is associated with different command cards for user 1 and user 2. The team command card includes a directive module, a unification module to unify data from the different command cards, and a distribution module. The distribution module includes executable instructions and memory for dividing the directive into sub-directives, and assigning different sub-directives to different command cards. For example, the command card for user 1 has a sub-directive module A and the command card for user 2 has a sub-directive module B. In other words, different command cards obtain and process data to answer different questions or achieve different goals, which are part of an overall directive. For example, the overall directive of the directive module in the team command card is to help a family of users to plan an itinerary for their first trip to Japan. The sub-directive module A has the directive to plan travel and accommodations, and the sub-directive module B has the directive to plan activities and sight-seeing.

It is herein recognized that the devices, systems and the methods described herein enable the provision of relevant digital content specific to the interest of a given user.

In an example aspect, the devices in combination with the data enablement platform provides people with "Perfect Information", a concept from economists.

The data enable platform described herein, in combination with the user device or the OCD, or both, provide perfect information to help a person consume digital media content and to interact with the digital media content. A user, for example, talks with a chatbot on the user device or the OCD.

In preferred embodiments, the chatbot has language capabilities to interact with the user via text language or spoken language or both. However, in other example embodiment, the command card user interface does not necessarily chat with a user, but still affects the display of data being presented to the user.

The systems described herein provide a collection of command cards with intelligent bots tied to each command card. Each command card is created or customized by a user and that represents a topic, theme, interest, query, research project, goal, etc. For example, a user can orally speak into the application and say, "Hey Bot, create a black hole entanglement command card." The application, in turn, creates a command card, selects a picture from the web depicting black hole entanglement, and displays words below the picture stating "Black hole entanglement." In an alternative example embodiment, the user uses their brain signals, nerve signals, or muscle signals, or a combination thereof, to generate user input data that is converted to speech by the user device or the data enablement program, in which the processed speech is "Hey Bot, create a black hole entanglement command card."

It will be appreciated that the term "command card" herein refers to a unified collection of data that answers or is relevant to the directive associated with it. The data includes, for example, one or more of text data, audio data and visual data (e.g. images or video, or both).

Various search bots associated with the command card for black hole entanglement begin autonomously searching the Internet news, blogs, forums, periodicals, magazines, social sites, video sites, etc. multimedia (text, audio, video, pictures) that closely match the key words and phrase "black hole entanglement". These search bots uses data science, such as, but not limited to, K Means clustering, to identify attributes and characteristics that most closely reflect the attributes and characteristics of black hole entanglement. The behavior bots associated with this command card filter or process the found data, or both.

The user subsequently selects the black hole entanglement command card, via the user interface, and consequently the command card begins displaying summary information, pictures, article, videos, etc. of information specific to black hole entanglement based upon the results after filtering or processing, or both, by the behavior bots.

The user can orally or manually say in relation to each multimedia picture, text, audio, video, whether he or she likes or dislikes the content. A behavior bot begins learning what the user likes and dislikes about the K Means results and subsequently tunes the data science to present results that are more like the machine learned user "likes".

The user, via the notes module of the command card, can also comment on the content by via a microphone or via other sensors like brain signal sensors, muscle signal sensors or nerve signal sensors, or a combination thereof. For example, the user may comment: This theory sounds familiar; or The new satellite from ABC Inc. should provide more facts that support this theory. The command card, via the data enablement platform, uses this information to provide related information in the same digital magazine.

In a particular example, as the user reads, listens, or watches a multimedia piece, the user can tell the application to pause. At this pause point, the user can create voice and typed-in bot notes linked to a key words, phrases, pictures, video frames, sound bytes in the multimedia; this implemented using a pause point bot. These user-created bot notes enable the user to insert thoughts, comments, reminders, to do's etc. and are indexed for future access. At this pause point, in an alternative embodiment, the user can perform a search using search engines such as Google or Bing. If the user likes one of the results from the search results page, the user can orally connect that linked multimedia to the digital magazine pause point for future reference. At this pause point, in an alternative embodiment, the user can orally link to a different web site, forum, blog, forum, etc., search for results, and link this resulting information back to the pause point. The pause point bot can simultaneously begin searching for other Internet multimedia documents, apply K means to the results and recommend other multimedia documents that are very similar to each comment, to do, reminder, search result link, forum, blogs, news, periodical, etc—this is akin to people who saw these results for a topic also searched and found X multimedia, with has characteristics and attributes closely related to a specific thought, to do, video, etc.

As the user reads, listens, and adds more related comments, notes, links, etc, to the black hole entanglement command card, the user has the option to publish and share his command card with other people via social media, forums, blogs, etc.

The user-created or user-appended notes associated with the command card can include documents, captured pictures/videos, audio recordings, and inputted IoT data.

As the user adds comments to the command card (e.g. via oral, typing, brain signals, nerve signals, muscle signals, etc.), a behavior bot applies sentiment analysis to the user-inputted comments creating meta data that can help the behavior bot understand excitement, sadness, etc. toward a piece (e.g. an article, a video, a blog entry, an audio cast or podcast, etc.) in the command card.

As the user adds speech, picture, and video comments to the digital magazine, another behavior bot can record/observe for background noise, background picture/video elements (location, color, people, objects) creating meta data that can help the behavior bot to better understand context or the environment of where a user is consuming information about the black hole entanglement command card. For example, the data enablement platform determines if the user is consuming the media while on a train, or on a plane, or in a bathroom, or at a park, or with people around them, etc.

The user interface module of the black hole entanglement card can also compute and generate a visual graph data representation showing how all of the black hole entanglement media pieces are related to one another for easy future access as well as propose and recommend other media articles, web site, news, blogs, and forums to view and potentially add to the black hole entanglement digital magazine.

The data enablement platform also enables other people to follow a user's specific command card if the command card creator publishes and allows people to follow this command card.

In an example aspect, a person who has created a command card for a certain topic can adjust settings that direct the data enablement platform to privately share the given command card with selected contacts, or to be shared publicly.

The system enables the command card creator to receive comments, questions, links, digital media and to decide whether to add this submitted information to the existing black hole entanglement command card.

In an example aspect, the results of the aforementioned information on a specific topic, theme, interest, etc. results in the closest, real time, perfect information.

Based on these technical features, in effect to the user, a user who is an enthusiast no longer has to do searches that are deep and relevant to the directive. The data enablement platform and the user device or devices pull the information together for the user in an easy-to-consume and interactive format.

Figure 11:
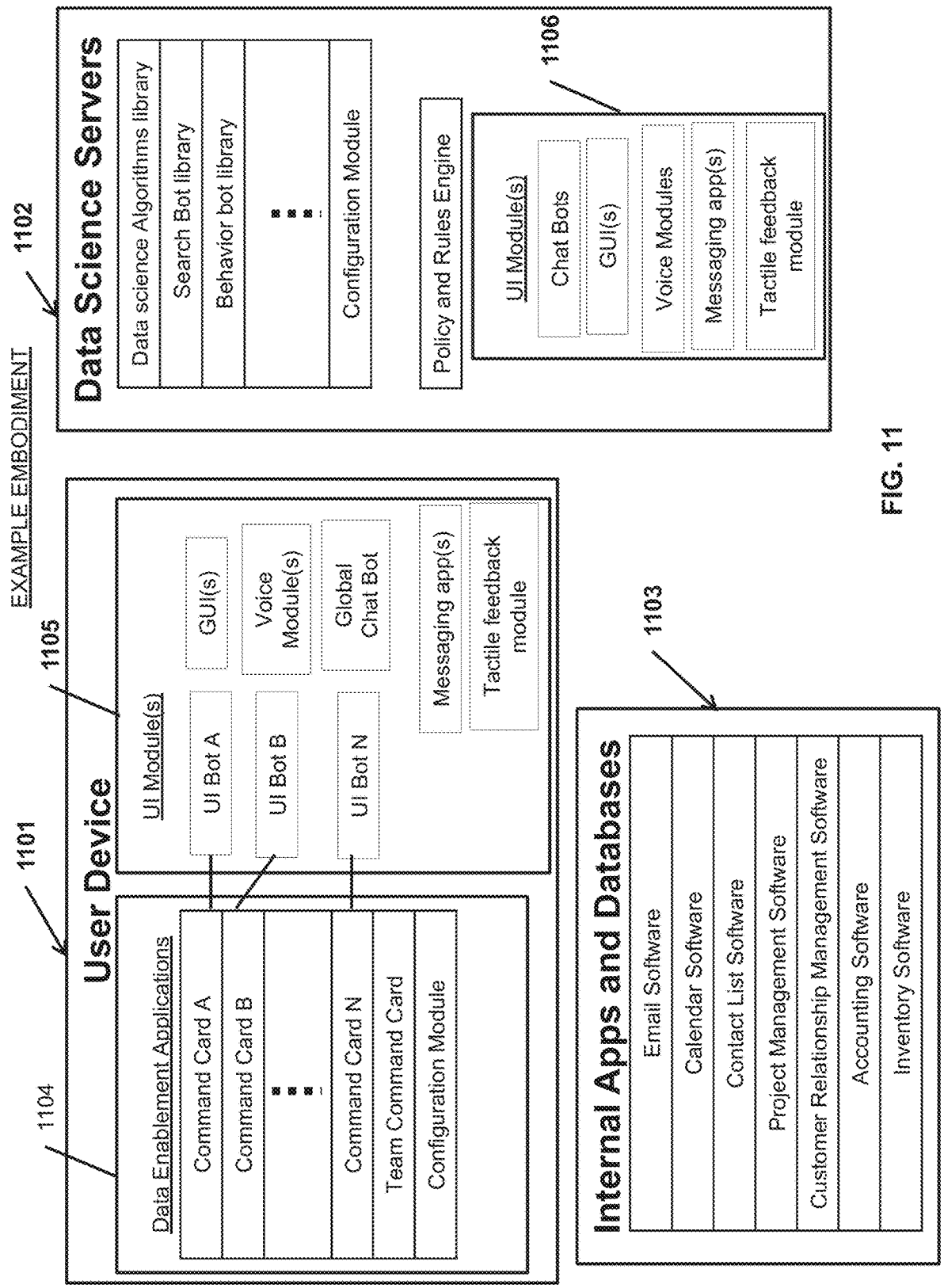
FIG. 11 is a block diagram of example software modules residing on the user device and the data enablement platform.

Turning to FIG. 11, an example embodiment is provided of software modules that reside on a given user device 1101, data science servers 1102, and internal applications and databases 1103.

For example, a data enablement application 1104 resides on the user device and the application includes: a Command Card A, Command B, Command Card N, and so forth, an Team Command Card, and a configuration module. The user device also includes user interface (UI) modules 1105, which can be part of the data enablement application 1104, or may interact with the data enablement application 1104. The UI modules includes user interface bots (e.g. chatbots) that are associated with, or part of, each command card. For example, UI Bot A is linked to Command Card A, and UI Bot B is linked to Command Card B. There is also a global chatbot that interfaces with the overall application 1104 and with the command cards. The UI modules also include one or more GUIs, one or more messaging applications, one or more synthesizer voice modules, and one or more tactile feedback modules, or combinations thereof.

The data science servers 1102 include a data science algorithms library, a search bot library containing various search bots, a behavior bot library containing various behavior bots, a configuration module, and a policy and rules engine. For example, the policy and rules engine includes policies and rules that are specific to the company or organization using the data enablement platform.

Regarding the data science algorithms library, it will be appreciated that data science herein refers to math and science applied to data in the form including but not limited to algorithms, machine learning, artificial science, neutral networks, etc. The results from data science include, but are not limited to, business and technical trends, recommendations, actions, trends, etc. The search bots and behavior bots obtain executable code for conducting data science and machine learning from the data science algorithms library.

In an example aspect, Surface, Trend, Recommend, Infer, Predict and Action (STRIPA) algorithms are included in the data science algorithms library. This family of STRIPA algorithms worth together and are used to classify specific types of data science to related classes.

Non-limiting examples of other data science algorithms that are in the data science library include: Word2vec Representation Learning; Sentiment (e.g. multi-modal, aspect, contextual, etc.); Negation cue, scope detection; Topic classification; TF-IDF Feature Vector; Entity Extraction; Document summary; Pagerank; Modularity; Induced subgraph; Bi-graph propagation; Label propagation for inference; Breadth First Search; Eigen-centrality, in/out-degree; Monte Carlo Markov Chain (MCMC) simulation on GPU; Deep Learning with region based convolutional neural networks (R-CNN); Torch, Caffe, Torch on GPU; Logo detection; ImageNet, GoogleNet object detection; SIFT, SegNet Regions of interest; Sequence Learning for combined NLP & Image; K-means, Hierarchical Clustering; Decision Trees; Linear, Logistic regression; Affinity Association rules; Naive Bayes; Support Vector Machine (SVM); Trend time series; Burst anomaly detection; KNN classifier; Language Detection; Surface contextual Sentiment, Trend, Recommendation; Emerging Trends; Whats Unique Finder; Real-time event Trends; Trend Insights; Related Query Suggestions; Entity Relationship Graph of Users, products, brands, companies; Entity Inference: Geo, Age, Gender, Demog, etc.; Topic classification; Aspect based NLP (Word2Vec, NLP query, etc.); Analytics and reporting; Video & audio recognition; Intent prediction; Optimal path to result; Attribution based optimization; Search and finding; and Network based optimization.

In other example embodiments, the aforementioned data science can reside on the user's smartphone, or in public or private clouds, or at a company's data center, or any combination of the aforementioned.

Continuing with FIG. 11, UI modules 1106 also reside on the data science servers 1102.

In an example embodiment, internal applications and database 1103 are used to assist in fulfilling the directives of command cards. Examples of such software and databases include: email software, calendar software, contact list software, project management software, CRM software, accounting software, and inventory software. Each of these different software are different data sources, and different search bots are used to respectively search these different software.

Figure 12:
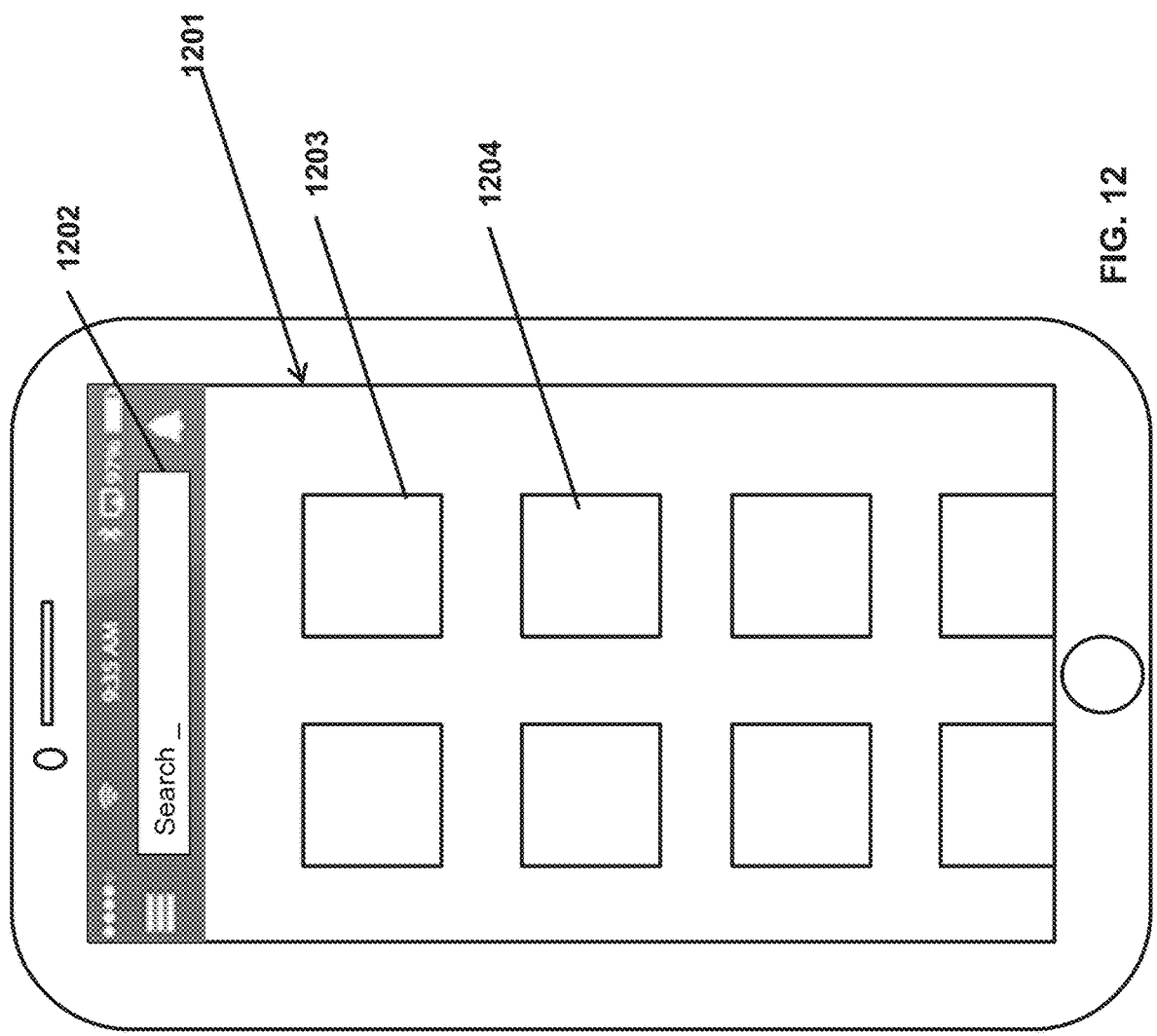
FIGS. 12 and 13 are screenshots of example graphical user interfaces (GUIs) of a command card displayed on a user device.
Figure 13:
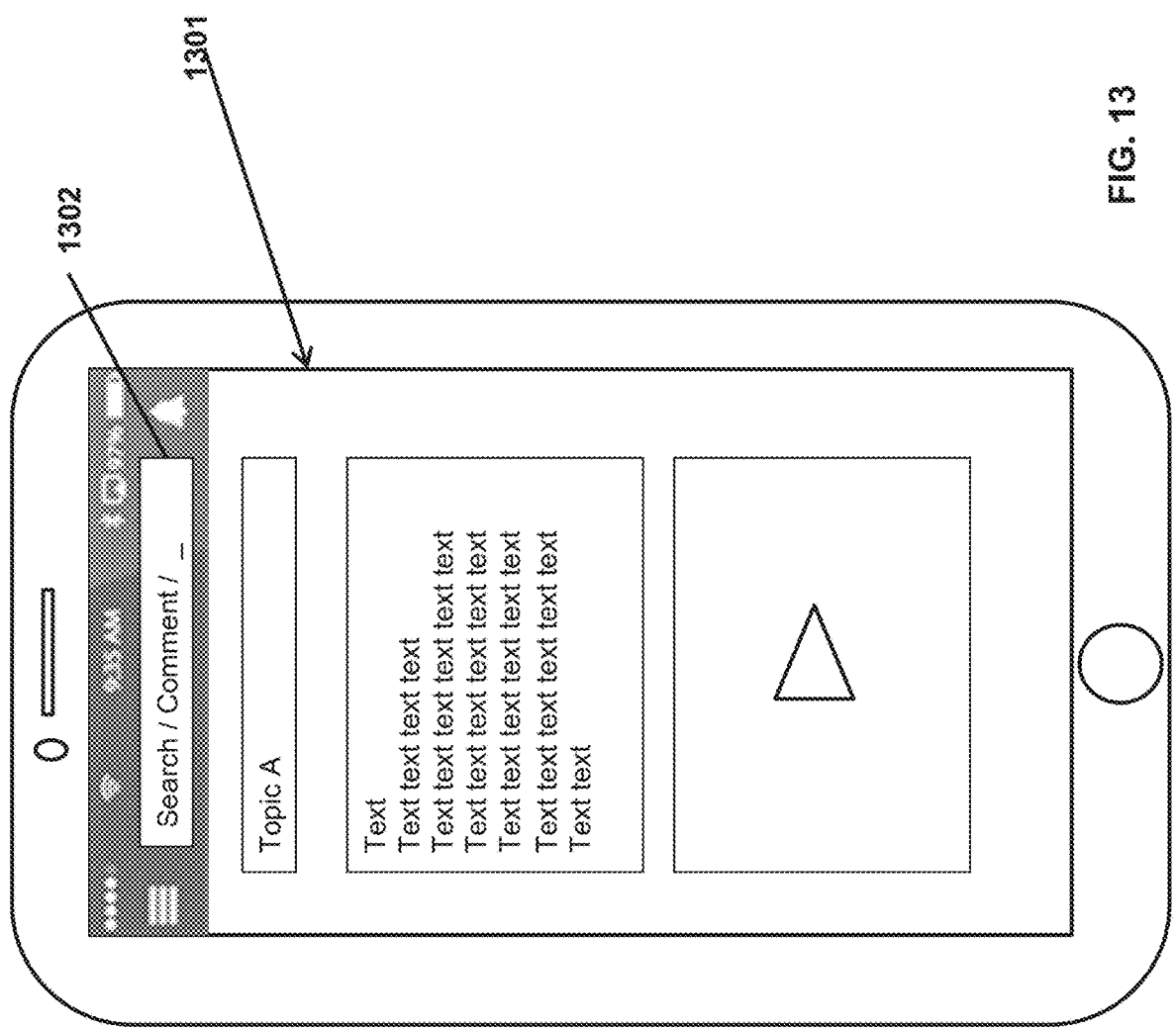

FIGS. 12 and 13 include screenshots of example GUIs shown for applying the data enablement system to the display data for a command card.

In FIG. 12, a home landing page 1201 is shown for the data enablement application. It includes a search field 1202 to receive text input for topics, names, things, etc. A user can also speak to the global chatbot to explore or search for topics, names, things, etc. It also includes GUI controls 1203, 1204 for activating each command card. For example, the control 1203 represents a command card about black hole entanglement and the control 1204 represents a different command card about planning an itinerary for a first trip to Japan. By receiving a selection (e.g. either through a GUI or by an oral command) of one of these controls, the user device will launch a GUI specific to the selected command card and will activate the corresponding UI bot.

FIG. 13 shows an example GUI 1301 of a selected command card. The layout and format of the content can change over time, and can vary from user to user. The GUI can include text, video, or images, or a combination thereof. A text field 1302 receives text input to initiate searches or to store comments related to a given digital media piece. The display of visual content can be scrolled up or down, or can be presented as pages that can be turned over.

By selecting a piece of content in the GUI, the UI bot begins to read aloud the content.

It is appreciated that the content in the command card user interface can be updated in realtime, even while the user is viewing the GUI, as content is procured by the search bots and the behavior bots of the command card.

The depicted control elements are for example. Other control elements with different data science, bots, features, and functionality may be added and mixed with other control elements.

Below are example questions and statement posed by a user, and oral feedback provided by the UI bot (e.g. chatbot). It will be appreciated that the UI bot is conversational and adapts to the style of the user to which it is speaking.

Example 1

User: Hey Bot, provide me with articles about topic X.
Bot: Hey User, here are the most recent articles about topic X and the most cited articles about topic X.
The Bot reads out summaries of the latest 3 new articles pulled from various data sources, and reads out summaries of the 3 most cited articles.

Example 2

User: Hey Bot, read article XYZ for me.
Bot reads out the article XYZ.
User: Hey Bot, please repeat the last few sentences.
Bot re-reads the last three sentences, pauses, and then continues reading the rest of article XYZ.

Example 3

User: Hey Bot, read article XYZ for me.
Bot reads out the article XYZ.
User: Hey Bot, I think the perspective on theory R is interesting. Professor P is doing some research to disprove it.
Bot: Hey User, I have found more content about theory R, articles from Professor P about theory R, and other content about disproving theory R. Do you want to hear this content now or save it for later?
User: Hey Bot, continue reading the article and then read me the articles from Professor P.

Bot continues to read out the article XYZ. Afterwards, Bot reads out the articles from Professor P.

Example 4

User: Hey Bot, show me the current production capacity. Search bots gather IoT data regarding manufacturing machinery productivity and the command card UI bot generates a graph showing production capacity of each piece of machinery.

Figure 14:
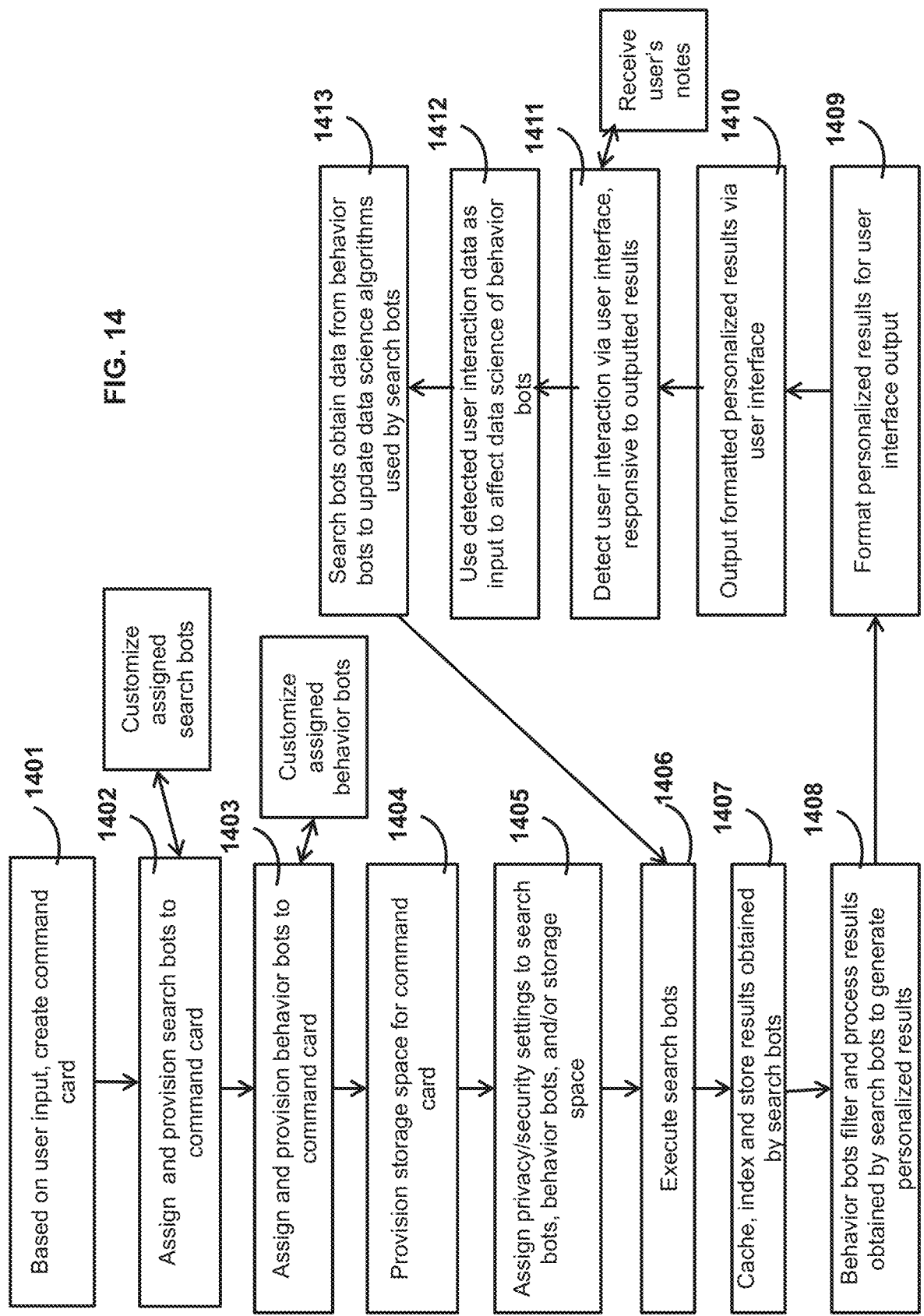
FIG. 14 is a flow diagram of example executable instructions for using a command card with the data enablement platform to provide relevant information for a given directive.

Turning to FIG. 14, example computing operations are implemented by the data enablement platform to search for and output personalized data to a user.

Block 1401: Based on user input, the data enablement platform creates a command card. This includes the directive module receiving a user-inputted directive, and processing the same to generate a computer readable directive.

Block 1402: The data enablement platform assigns and provisions search bots to the command card. The provisioning includes creating each search bot that searches a different data source to fulfill the directive. This can be done automatically or semi-automatically. For example, a user can select, via a UI, the data sources to be searched, which in turn determines the type of search bots. The user can also adjust parameters of the assigned search bots, thereby customizing the search bots. For example, the user can input certain keywords, names, or types of data, for a given search bot to use in their searching computations.

Block 1403: The data enablement platform assigns and provisions behavior bots to the command card. This includes creating each behavior bot to monitor, understand, and potentially predict behavior data, in the context of the command card and its directive. This can be done automatically or semi-automatically. For example, a user can select certain behaviors to be monitored. The user can also customize the behavior bots to have certain biases that are specific to a given command card.

Block 1404: The data enablement platform provisions storage space for the command card. For example, the storage space is provisioned in the data lake.

Block 1405: The data enablement platform assigns privacy/security settings to search bots, behavior bots, or storage space, or a combination thereof. This can be done according to a default setting, and can be customized by the user.

Block 1406: The search bots are executed. Although the search bots have the same directive, they operate in independently and in parallel to each other.

Block 1407: The data enablement platform caches, indexes and stores results obtained by the search bots.

Block 1408: The behavior bots filter and process the results obtained by the search bots to generate personalized results.

Block 1409: As part of the processing by the behavior bots, or by the overall command card, the data enablement platform formats the personalized results for output via the user interface.

Block 1410: The user interface module of the command card outputs the formatted personalized results via one or more user devices.

Block 1411: The data enablement platform detects user interaction via the user interface module, which are responsive to outputted results. The types of user interaction depend on the types of user devices and user interfaces provided in this system.

Block 1412: The behavior bots use the detected user interaction data as input to affect the data science of the behavior bots. These revised or self-modified behavior bots are used in future iterations of filtering and processing data.

Block 1413: The search bots obtain data from the behavior bots to update data science algorithms used by the search bots. These revised or self-modified search bots are then used in future iterations for searching for data. The process repeats at block 1406 and onwards.

In an example embodiment, the process is continuous from block 1406 onwards, with the search bots continuously searching for data and each produce their own data stream.

Figure 15:
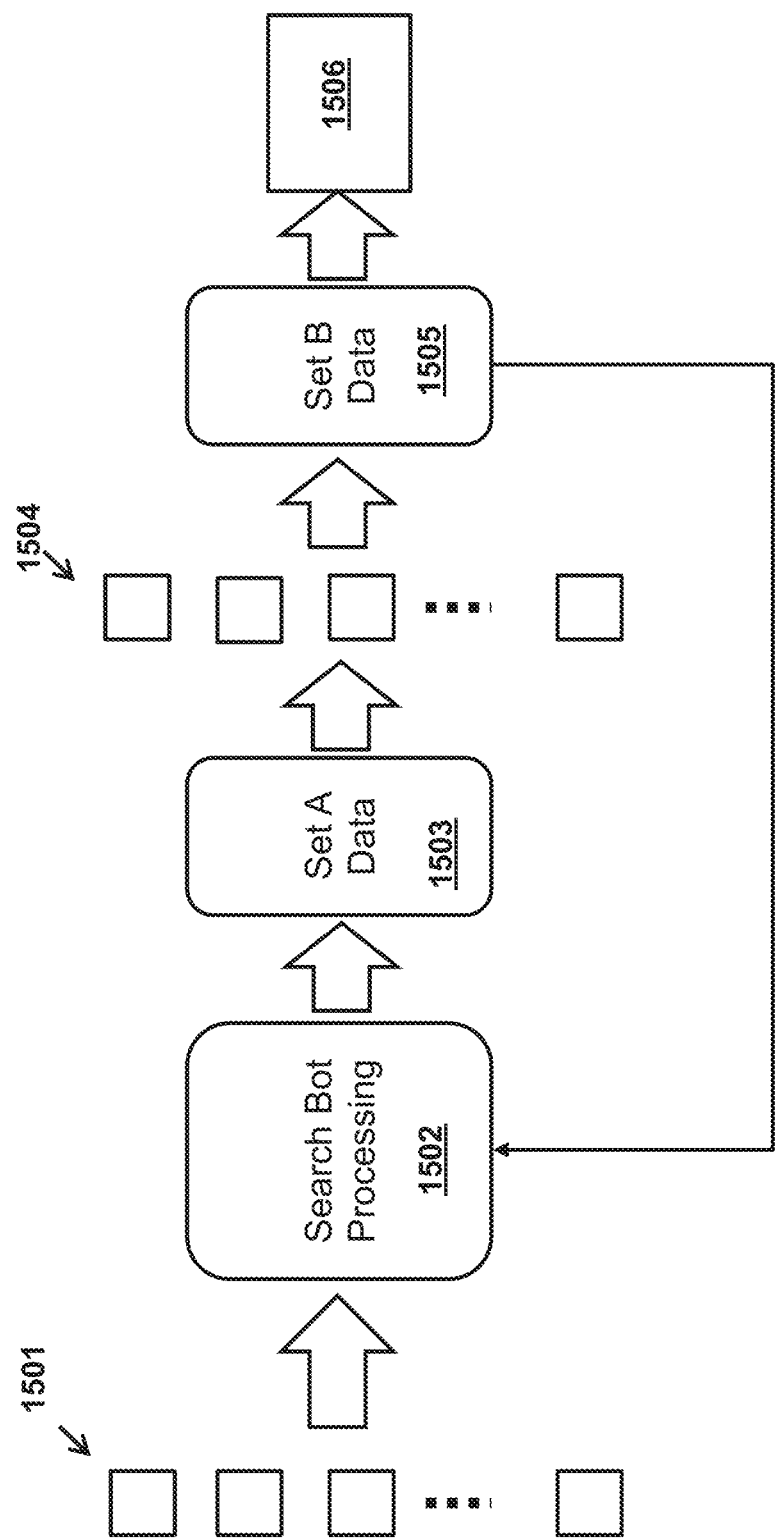
FIG. 15 is another flow diagram showing the flow of data between search bots and behavior bots.

Turning to FIG. 15, according to another example embodiment, a computational flow diagram is shown for using the search bots and the behavior bots. Different search bots 1501 are used to search different data sources. For example, there are different search bots corresponding to each of the different data sources: a search bot for social data, a search bot for a given search engine, a search bot for a career website, a search bot for IoT data, a search bot for virtual or augmented reality data, a search bot for edge device data, a search bot for enterprise resource planning (ERP) data, a search bot of music data, a search bot for video data, and a search bot for $3^{rd}$ party data.

As per block 1502, each search bot performs search operations for relevant data. For example, a crawler technology is used in some cases to obtain the relevant data. Each search bot ingests and caches the data results. Each search bot applies data science to the data results. If user defined keywords, hashtags, queries are provided, then the search bots apply this user-defined input to the data results. Each search bot filters, surfaces and generates a revise set of data using the above operations, to generate Set A data set.

At block 1503, the data of Set A includes all the relevant answers, recommendations, and information that are relevant to the directive of the command card. This information is cached, indexed, and data links to the source data are stored. The source data can include one or more of the following: pictures, videos, social content, music, IoT data, edge device data, $3^{rd}$ party data, ERP data, virtual reality or augmented reality data, career site data, news, blogs, forums, and other Internet sites.

The behavior bots 1504 personalize the Set A data, which results in Set B data 1505. In an example embodiment, the behavior bots 1504 include a mix of one or more local behavior bots and one or more global behavior bots. For example, a local behavior bot is specific to the user. A global behavior bot is specific to a group of users (e.g. an organization) of which a given user is a member. For example, a given local behavior bot is specific to interests or biases of a given user, and a given global behavior bot is specific to ethics that represent the group of users.

The Set B data is a subset of the Set A data, and it may be further transformed in its summarization and presentation to reflect the behavior data features determined by the behavior bots.

At block 1505, the Set B data includes data that is tailored to a given user, a given group, a given department, a given organization, etc. based on the machine learned profile generated by the behavior bots. This Set B data is cached, indexed, and the links to the source data are stored. This Set B data may also be ranked and scored for relevancy.

At block 1506, the answers, recommendations, and information of the Set B data are presented via APIs, applications, and one or more user devices.

The outputs of block 1505 are used to inform the search bots, which can adjust their search and data science parameters based on certain behavior features.

Figure 16:
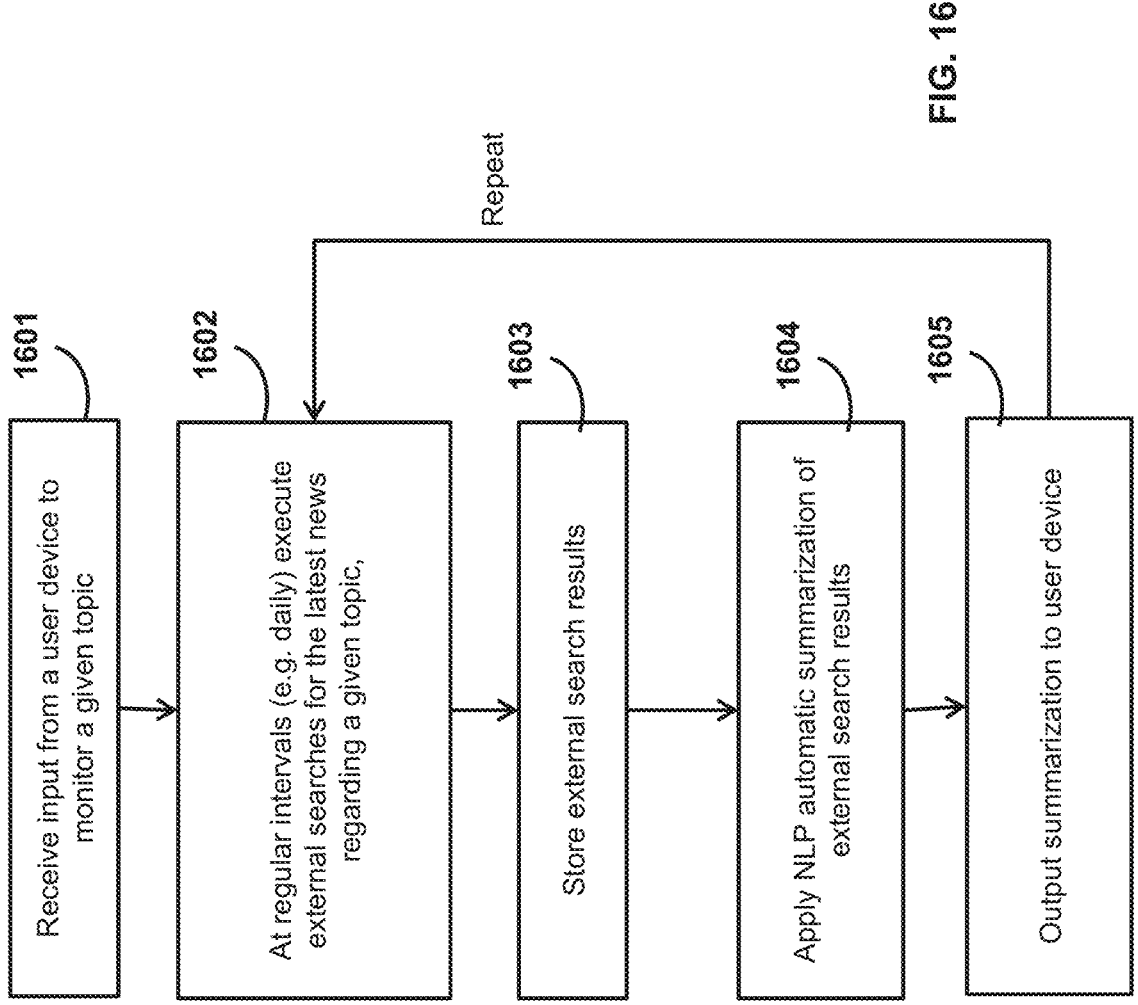
FIG. 16 is a flow diagram of example executable instructions for using the data enablement platform to monitor a given topic.

Turning to FIG. 16, an example computation is shown for applying natural language processing (NLP). At block 1601, the user device or the OCD receives input to monitor a given topic. At block 1602, at regular intervals (e.g. daily), the data enablement platform executes external searches for the latest news regarding a given topic. At block 1603, the external search results are stored in memory. At block 1604, the data enablement platform applies NLP automatic summarization of the search results and outputs the summarization to the user device (e.g. via audio feedback) (block 1605). The process then repeats at regular intervals, as per block 1602.

Figure 17:
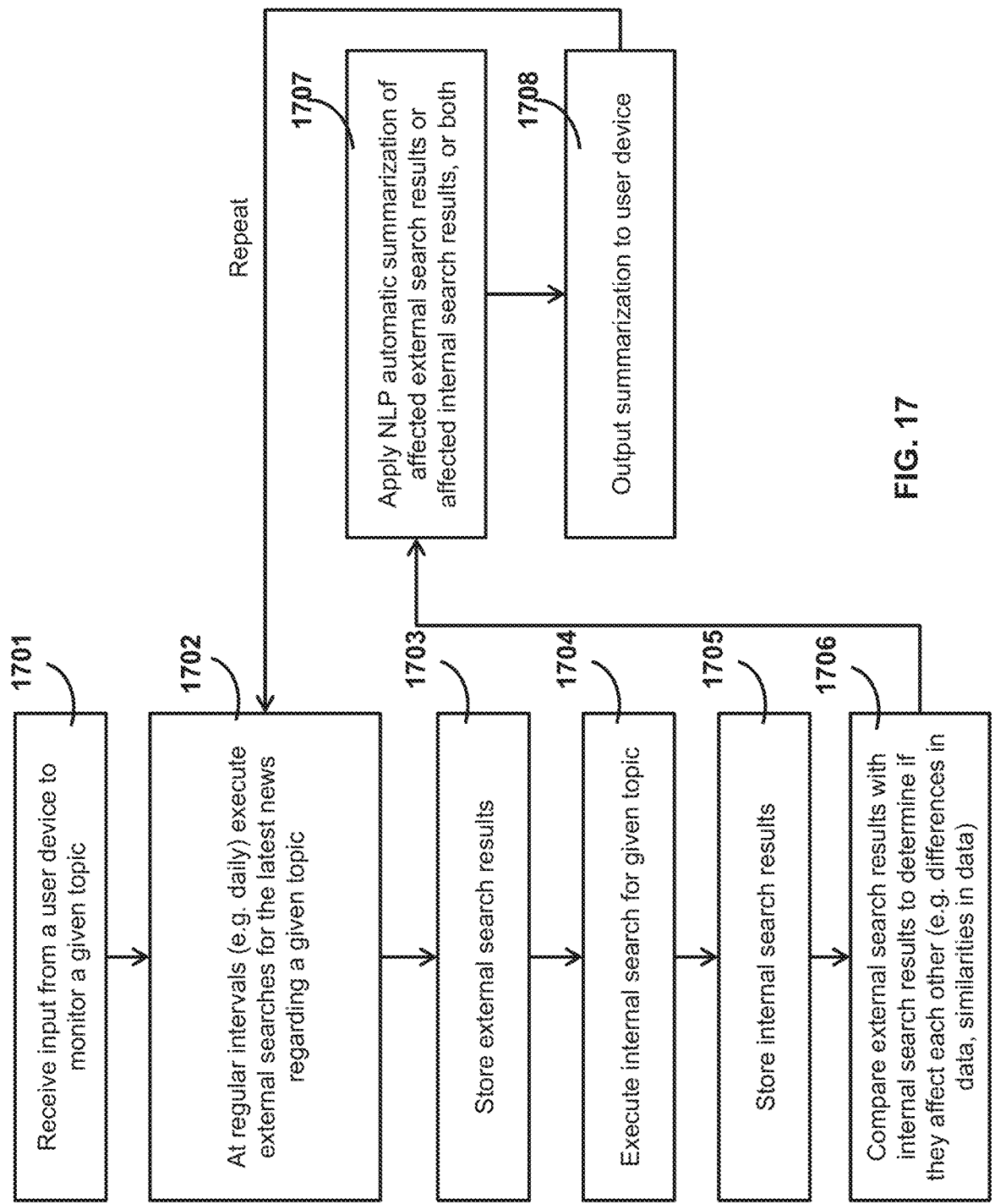
FIG. 17 is a flow diagram of example executable instructions for using the data enablement platform to monitor a given topic, including using both internal and external data.

Turning to FIG. 17, another example computation is provided. At block 1701, the user device or the OCD receives input to obtain information about a given topic, as per a directive of a command card. At block 1702, at regular intervals (e.g. daily), the data enablement platform, via search bots, executes external searches for the latest news regarding a given topic. At block 1703, the external search results are stored in memory. At block 1704, the data enablement platform, via search bots, executes internal searches for the given topic. At block 1705, these internal search results are stored. At block 1706, the data enablement platform compares the external search results with the internal search results to determine if they affect each other. For example, the data enablement platform determines if there are differences in the data or similarities in the data, or both. At block 1707, the data enablement platform applies NLP automatic summarization of the affected external search results, or the affected internal search results, or both. The summarization is outputted to the user device for visual display or audio feedback (block 1708). In this way, a user is informed of relevant news and why the news is relevant (e.g. affected internal data, etc.).

In an example embodiment, the above methods in FIG. 16 or 17 are used to provide a UI bot, or chatbot, that provides a fast and easy way to consume news summaries (e.g. news releases, investigative articles, documentaries, LinkedIn, Facebook fan page, etc.) for each specific topic.

Figure 18:
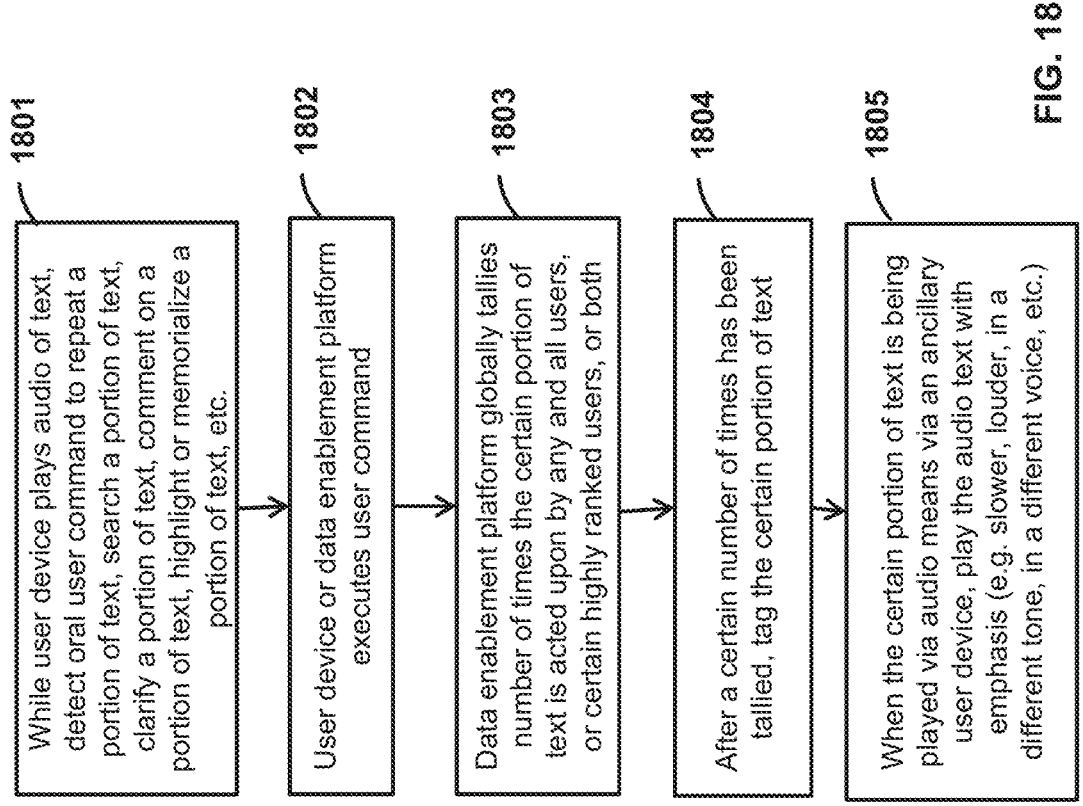
FIG. 18 is a flow diagram of example executable instructions for using the data enablement platform to modify the audio parameters of certain phrases and sentences.

Turning to FIG. 18, example executable instructions are provided for using dynamic searches to affect the way certain data is outputted at the user device.

Block 1801: While the user device plays audio of text, the user device detects a user's oral command to at least one of: repeat a portion of text, search a portion of text, clarify a portion of text, comment on a portion of text, highlight or memorialize a portion of text, etc.

Block 1802: The user device or the data enablement platform, or both, executes the user's command.

Block 1803: The data enablement platform globally tallies the number of times the certain portion of text is acted upon by any and all users, or certain highly ranked users, or both.

Block 1804: After a certain number of times has been counted, the data enablement platform tags the certain portion of text.

Block 1805: When the certain portion of text, which is tagged, is being played via audio means via an ancillary user device, the user device plays the audio text with emphasis (e.g. slower, louder, in a different tone, in a different voice, etc.). In other words, the data enablement platform has tagged the certain portion of the text and has performed an audio transformation on the certain portion of text.

Therefore, if User 1 comments on some text or audio or video, when User 2 reviews the same data, the chatbot for User 2 will read out the text with emphasis. In an example embodiment, User 2 does not know what comments are, but only that the portion of text was considered important by many users.

Figure 19:
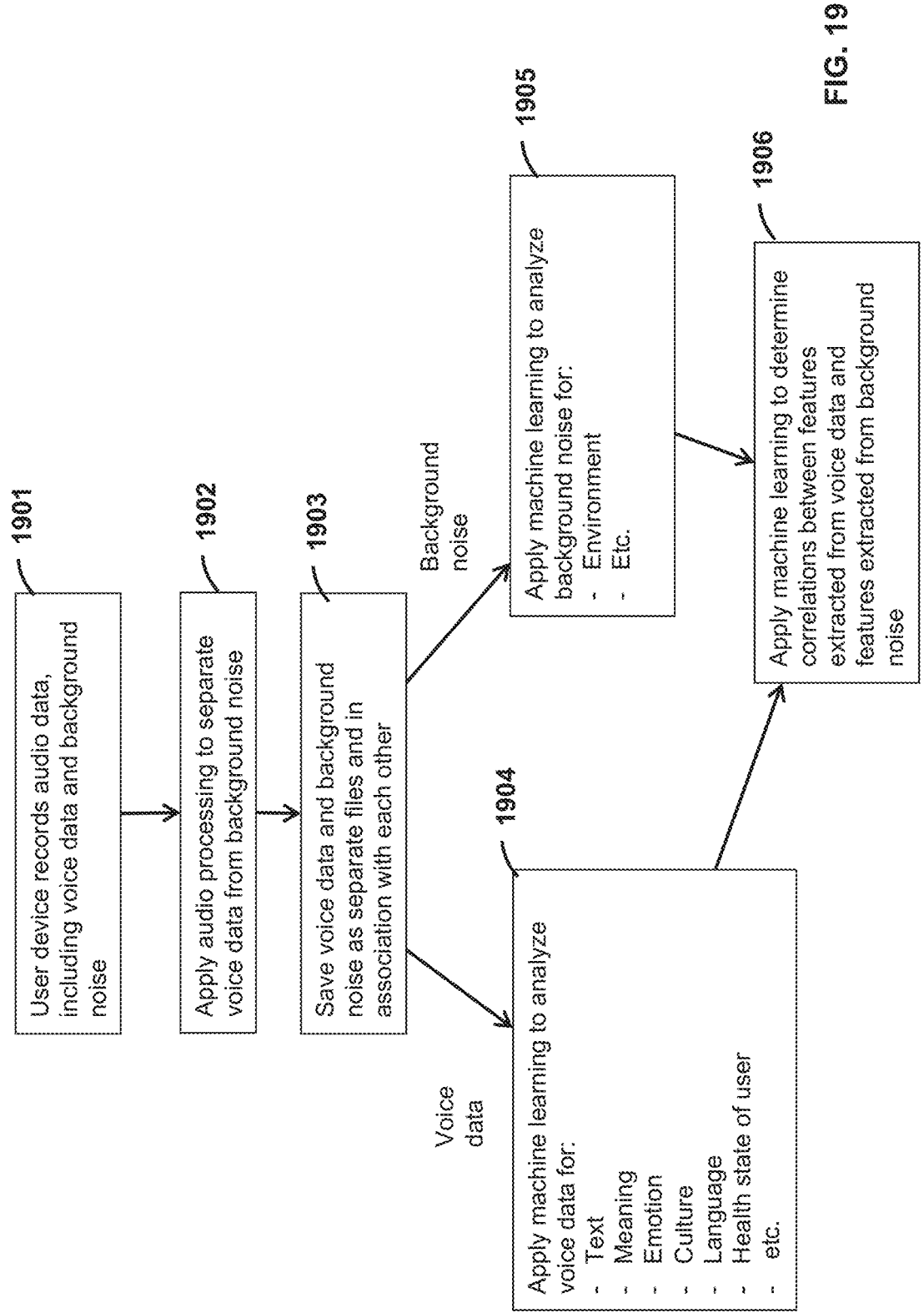
FIG. 19 is a flow diagram of example executable instructions for using the data enablement platform to extract data features from voice data and associated background noise.

Turning to FIG. 19, example executable instructions are provided for processing voice data and background noise.

Block 1901: The user device or the OCD records audio data, including voice data and background noise.

Block 1902: The data enablement platform applies audio processing to separate voice data from background noise.

Block 1903: The data enablement platform saves the voice data and the background noise as separate files and in association with each other.

Block 1904: The data enablement platform applies machine learning to analyze voice data for: text; meaning; emotion; culture; language; health state of user; etc.

Block 1905: The data enablement platform applies machine learning to analyze background noise for: environment, current activity engaged by user, etc.

Block 1906: The data enablement platform applies machine learning to determine correlations between features extracted from voice data and features extracted from background noise.

In this way, information about the user can be more accurately determined, such as their behavior and their surroundings. This information is stored as part of a given user profile (e.g. User 1 Profile, User 2 Profile, etc.). This in turn can be used curate more relevant content to a user, identify similar users, format the output of the content (e.g. language, speed of reading, volume, visual layout, font, etc.) to meet the profile of the user, and provide data to publishers and content producers to generate more relevant content.

Figure 20:
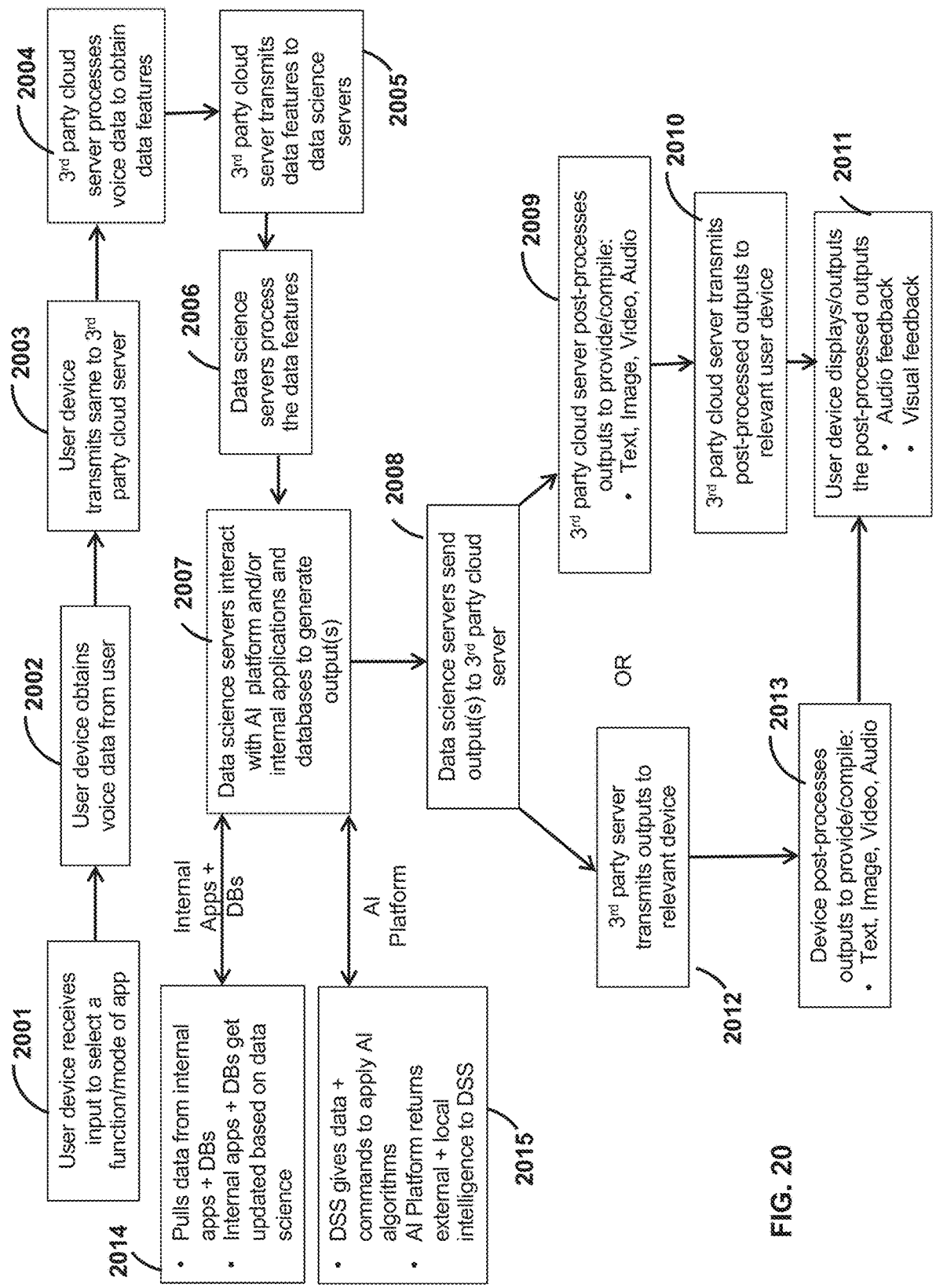
FIG. 20 is a flow diagram of example executable instructions for using the data enablement platform to provide meaningful and interactive data to the user device.

Turning to FIG. 20, example computer executable instructions are provided for processing data using the data enablement platform. At block 2001, a user device or an OCD, or both, receives input to select a function or a mode of an application (e.g. the data enablement application) that resides on the user device. At block 2002, the user device or the OCD, or both, obtains voice data from a user. At block 2003, the user device or the OCD, or both, transmits the same data to the $3^{rd}$ party cloud computing servers. The user device also transmits, for example, contextual data. At block 2004, the $3^{rd}$ party cloud computing servers processes the voice data to obtain data features.

Non-limiting examples of extracted data features include text, sentiment, action tags (e.g. commands, requests, questions, urgency, etc.), voice features, etc. Non-limiting examples of contextual features include the user information, device information, location, function or mode of the data enablement application (e.g. the selected command card), and a date and time tag.

The extracted data features and the contextual features are transmitted to the data science servers (block 2005). The original data (e.g. raw audio data) may also be transmitted to the data science servers. At block 2006, the data science servers process this received data.

At block 2007, the data science servers interact with the AI platform, or the internal applications and internal databases, or both, to generate one or more outputs.

The data science servers then send the one or more outputs to the $3^{rd}$ party cloud computing servers (block 2008). In one example embodiment, the $3^{rd}$ party cloud computing servers post-processes the outputs to provide or compile text, image, video or audio data, or combinations thereof (block 2009). At block 2010, the $3^{rd}$ party cloud computing servers transmit the post-processed outputs to the relevant user device(s) or OCD(s). At block 2011, the user device(s) or the OCD(s), or both, output the post-processed outputs, for example, via an audio device or a display device, or both.

In an alternative embodiment, stemming from block 2008, the 3$^{rd}$ party cloud computing server transmits the outputs to the one or more relevant devices (e.g. user devices or OCDs) at block 2012. The post-processing is then executed locally on the one or more relevant devices (block 2013). These post-processed outputs are then outputted via audio devices or visual devices, or both on the one or more user devices or OCDs (block 2011).

Turning back to block 2007, in an example aspect, the data science servers pull data from the internal applications and internal databases, or the internal applications and internal database are updated based on the results produced by the data science servers, or both (block 2014).

In another example aspect, the data science servers transmit data and commands to the AI platform, to apply AI processes on the transmitted data. In return, the AI platform transmits external and local information and data intelligence to the data science servers. These operations are shown in block 2015.

It can be appreciated that any two or more of the operations in blocks 2007, 2014, and 2015 can affect each other. In an example embodiment, the outputs of block 2014 are used in the operations of block 2015. In another example embodiment, the outputs of block 2015 are used in the operations of block 2014.

Using the systems, devices and computing operations described herein, instead of wasting time trying to search and analyze all the latest and greatest information, a user can merely speak, gesture, and input data, photos, videos, audio, keywords, hashtags, etc. into the related to user's defined command card. Each digital command card represents a user's interest, search, project, opportunity, etc. The search bots autonomously search, sort, and filter the search result data using data science (AI, ML, STRIPA) and create a set of possible answers. As the set of answers becomes arriving, the system begins applying a different type of data science bots. These behavior bots are user behavior and profile bots that machine learn and understand my interests, likes, dislikes, etc. These behavior bots are applied to the set of possible answers and ultimately surface answers that are tailored to my behavior and profile. For example, using K value across the returned search result answers and my machine learned behavior profile, only the top answers or results would be prioritized and displayed in rank order. There could be hundreds of potentially right answers but only 2 or 3 that match my personality, behavior, or profile. Providing these 2 or 3 answers saves invaluable time to the user and facilitates making the most informed, "perfect information" decision that is available for that person.

Furthermore, the ability to creatively input and actively engage with the command card multimedia and data creates even more creative and richer answers using interactive devices such as augmented reality and virtual reality devices and rooms and wearable devices.

Example Process of Creating and Using a Command Card

At a first step, a user creates a digital command card and assigns n number of search bots to the command card. The user can type in or speak a command card name. In an example embodiment, the user selects existing bots or creates user defined bots.

Non-limiting example of search bots, which are specific to a given data source, include: Google bot; Bing bot; LinkedIn bot; FaceBook bot; news, blogs and forums bot; Fitbit bot; engine low oil IoT sensor bot; train braking system IoT sensor bot; network monitoring edge device; ERP bot; music bot; video bot; user defined query bot; augmented reality and virtual reality wearables and room bot; and 3$^{rd}$ party proprietary query bot.

In another aspect of the first step, the user can create their own unique bots. For example, a user can create a user defined query bot.

In another aspect of the first step, the user can reuse previously created bots.

In another aspect of the first step, the search bots retrieve data including pictures, videos, logs, text, machine data, and audio. The search bots perform data science against the pictures, videos, logs, text, machine data, and audio data. Non-limiting examples of data science processes include: k stat for grouping, and nearest neighbor for grouping similar cohorts.

In another aspect of the first step, behavior bots are provisioned as part of the command card. Baseline behavior are machine learned bots that apply overarching machine learnings to all command card search results. Each of these behavior bot monitors a different behavior feature that is specific to a given person or group, and uses the same for processing the data found by the search bots. Non-limiting examples of behavior bots include: my behavior pattern bot; my personality pattern bot; my spending pattern bot; my risk tolerance pattern bot; my affinities pattern bot; my interest pattern bot; my health pattern bot; my facial expression pattern bot; my spoken and tone pattern bot; my gesturing pattern bot; my sentiment pattern bot; my demographic pattern bot; my leisure bot; my relationship bot; my travel pattern bot; my economic status pattern bot; my education status bot; my sexual preferences pattern bot; my mentorship bot; my family bot; my work bot; my friends bot; my ethics bots; my learning bot; my bio-signal bot (e.g. for detecting one or more of brain signals, muscle signals and nerve signals); my optimism bot; and my Myers Briggs-like personality trait pattern bot.

These behavior bots, for example, are assigned with baseline behavior parameters that are known to a user. However, the behavior bots can evolve over time and become specific to a given command card. For example, a risk tolerance pattern bot for a first command card for a user, is different from a risk tolerance pattern bot for a second command card for the same user. In another example, my machine learned behavior pattern is modified for a specific command card as a user biases the local bot (example like/dislike content that is different from my normal behavior pattern). Biasing the local bot examples include liking and disliking command card results that a user reads and reacts towards. In another example, biasing the behavior bot also includes applying machine learning to recognize that the user clicks on more articles, pictures, videos relative to other articles, pictures, or videos. In another example, biasing the behavior bot includes machine learning oral notes (via NLP) of a user, or the tone of voice of the user, or understanding the sentiment of these notes, or a combination thereof. As a result, the behavior bot incorporates the user note bias into the local bot for screen or rank ordering the answers.

At a second step, the user initiates and operationalizes the command card. It includes the following steps:

1) Orally communicate, type in, or gesture a command card creation command into the data enablement application.

2) The data enablement application orally or prompts the user for the name of the command card.

3) User names the command card.

4) The data enablement application prompts user to select bots (e.g. search bots and behavior bots) from a library.

5) The user picks and selects bots to the command card.

6) The data enablement application prompts user to add people (optionally) to CRUD (create, read, update, delete) information in the command card for collaboration purposes.

7) User picks and selects people to CRUD information in the command card.

8) The data enablement application saves the newly created command card.

9) The data enablement application begins executing the bots previously selected.

10) The data enablement application send invites to people if they were added to the digital container for collaboration Below are the operations used to create user defined bots, as opposed to a user selecting from a library of existing bots.

1) Execute command to create bot.

2) Name the bot.

3) Define data source (social sites, enterprise database, Iot/Edge devices, news blogs forums, etc.).

4) Add keywords, hashtags, special queries/filters when performing search.

5) Select, parse and integrate data source API.

6) Select and integrate data science (ML, AI, STRIPA) that will be applied to the data source search results.

7) Define technical and business rules and policies for searching and streaming data. For example, some forums have crawling rules that prevent a computing system from an IP address (internet protocol address) from crawling their site more than once a day. If that rule is broken, the crawler bot is rejected from crawling on a go forward basis.

8) Save the newly created bot.

9) Add the newly created bot to the library of existing bots.

Below are example steps for picking existing bots from a library of bots.

1) Execute opening a new or existing command card.

2) Open bot library.

3) Pick and choose n number of bots from the bot library.

4) For each bot, the user can open the bot and read the bot search criteria.

5) The user can add, update, and delete bot specific keywords, hashtags, queries, 6) The modified bot is saved in the library and also as part of the command card.

7) Save the command card with newly added bots.

The user can read, add, update, and delete bots within a command card at any time.

At a third step of the overall process, the command cards begins executing the bots. This includes the following operations:

1) The search bot begins returning results.

2) Each command card caches the bot search results.

3) Data science is applied to each command card search bot results. For example, the data science includes determining relevance; determining key word/hashtag match; and determining the K stat; and nearest neighbor.

At a fourth step in the overall process, the results from the data science (the second step) are cached, indexed and stored.

In an aspect of the fourth step, the bot index and store links to photos, video, text, audio, machine data, IoT edge device, enterprise data, and other data. The bots do not store all the content, only the answers or a summary, and a link to the source data. The answers or the summary includes a picture or a text summary as a reminder to the user. The data enablement system therefore saves resources by avoiding storing known known data. The data enablement system stores the links and pathways to the data from disparate locations that results in an answer, which is recognized to be more effective and efficient when extreme data is involved.

At a fifth step in the overall process, the behavior bots are subsequently applied to the cached results obtained by the search bots, in order to tailor the set of "all possible answers" to a small "set of correct answers that also match my behavioral profile". In an example feature, the processed results are force ranked, scored, and displayed. In another example embodiment, although there may be potentially hundreds of right answers uncovered by the search bots, only 2 or 3 answers are displayed based upon the machine learned bot behavior profile and that are the correct answers for "me" (e.g. a given user). In another example aspect, a score is applied to all the possible answers provided by the search bots, based on the behavior bots processing, which the behavior bots can use in future iterations for machine learning.

At a sixth step, the user can interact with the entire set of all possible answers provided by the search bots, or just the 2 or 3 answers selected by and presented by the behavior bots in order to creatively explore for other interesting and related topics, ideas, places, people, events, etc. This information can be explored via a GUI that shows a Venn diagram of all possible answers and the selected 2 or 3 personalized answers as a subset of the possible answers.

In an aspect of the sixth step, user interaction can include oral navigated or type in creative exploration. In another aspect of the sixth step, user interaction can include augmented reality or virtual reality creative exploration. In another aspect of the sixth step, user interaction can include wearable device creative exploration. In another aspect of the sixth step, user interaction can include voice notes and meeting notes—annotations. In another aspect of the sixth step, user interaction can include adding pictures, videos, text, audio to the "answers". In another aspect of the sixth step, the results from any or all of the aforementioned creative exploration techniques can then be added to bias or adjust the behavior bots. In another aspect of the sixth step, the results from any or all of the aforementioned creative exploration techniques can add new content, hashtags, keywords, links, data to the existing command card. In another aspect of the sixth step, the user can elect to chain together other command cards that might become related over time.

At a seventh step, the second step to the sixth step autonomously and continuously run in order to continuously provide the most up to date "perfect information" answer.

Example Aspects of the Search Bots

The data science driven search bots search or crawl for data, or both, and cache the data from data sources. The search bots also perform data science on the cached search results, and filter and surface relevant results, The filtered and surfaced results is the Venn diagram of information, data, pictures, videos, data logs, machine data, IoT and edge device data, VR/AR data etc. that is relevant to the command card and search bot criteria. One or more search bots can be assigned to a command card.

In an aspect, the search bot collects information from a single data source or multiple data sources.

In another aspect, the search bot follows rules and policies (e.g. number of times a bot can crawl/query a site per day).

In another aspect, the results of the search bot are cached. For example, caching can occur at the edge device, smart phone device, IoT device, or in a public or private cloud, or any combination of the aforementioned.

In another aspect, the search bot nonstop executes the analysis, including applying data science against the cached search results that are streaming in. The data science filters and surfaces only data, information, and answers related to the command card directive and the bot criteria. For example, the search bot criteria includes filtering and surfacing the user entered (optional) matching keywords, hashtags, etc. applied to the cached search results.

The output from performing the analysis becomes the Set A data that is most relevant to the command card directive. The output results are presented in form of information, answers to a question, pictures, data, videos, machine data, machine data, audio data, etc.

In another aspect, the Set A data is temporal and, therefore can become outdated as new streaming data is provided by the search bots. For example, each bot continuously ingests streaming data, which in turn could modify Set A to Set A prime at time T+1, Set B double prime at T+2, etc. In another example, each bot could automatically search and crawl data sources on an hourly basis, daily basis, weekly basis, or monthly basis.

Example Aspects of the Behavior Bots

Data science driven behavior bots are behavior, personality, personality, profile bots that use behavioral data for training the machine learning algorithms.

These behavior bots can be for a specific person, a group of people, a department of people, a business, an organization, a one-time event of people, a group of people who have similar interests, affinities, preferences, or inclinations, an object, an avatar, a place, an event, an action, a time period, a theme, a period or time window in a person or object's, a historical period in time, a future period in time, or for a combination of these characteristics.

The behavior bots apply their data science against the "filtered and surfaced" result set obtained from the search bots, also called Set A data. The output from the behavior bots is information and answers that are tailored to the person's behavior, profile, etc. or a group of people's behavior, profile, or a department of people's behavior profile, a business behavior, profile, etc. and so forth as listed above. In an example aspect, the command card provides highly tailored recommendations, answers, and information that are tailored to my individual profile, my groups profile, department profile, etc., also called Set B data. This small group of Set B data is different than the Set A data, which can have hundreds of correct recommendations, answers and information that are very good but are not suited to the profile and behavior of myself or groups of like-minded people.

Like the Set A data, the Set B data is temporal.

The computing architecture described herein, and related systems and devices, include multiple search bots and multiple behavior bots. These search bots operate in parallel, and each search bot provides a real time feed dedicated to each data source. For each search bot, there is specific data science and processing that is optimized for each data source.

Similarly, the behavior bots operate in parallel, and each behavior bot is dedicated to monitoring a certain behavior attribute of user. Each behavior bot can filter out incoming streams of data, in parallel, and includes specific data science and processing optimized for each behavior bot. The behavior bots also advantageously collect behavior attributes and transform and combine data.

The distinction and separation between the search bots and the behavior bots allow the two classes of bots to operate in parallel to each other. Furthermore, the search bots and the behavior bots are specialized in different operations compared to each other. Furthermore, the distinction and separate between the search bots and the behavior bots, and also amongst the search bots, and also amongst the behavior bots, facilitates transferability and customizability of each both. It also allows for the overall computing architecture to be massively scalable to a massive number of users for many different types of directives.

Figure 21:
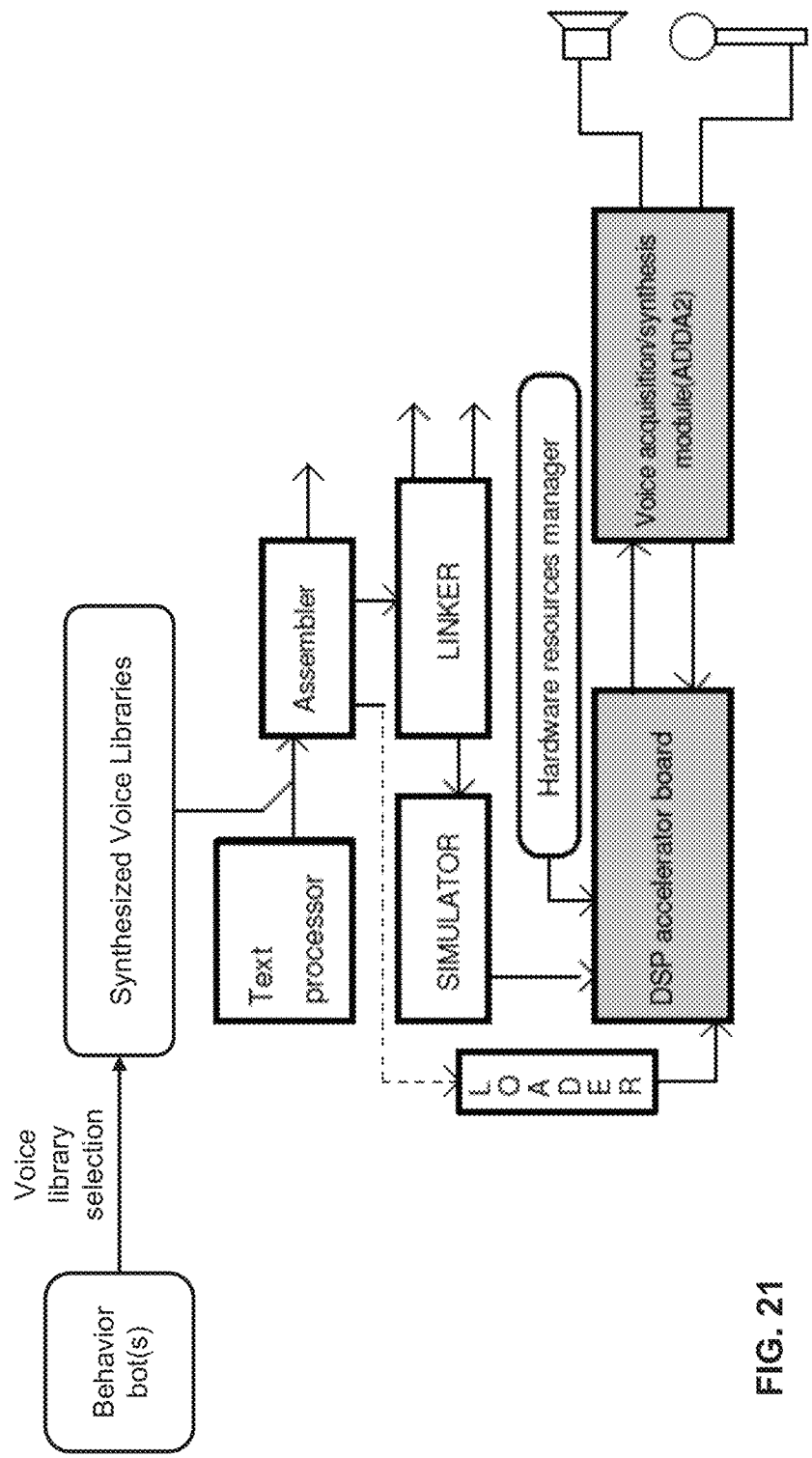
FIG. 21 is an example embodiment of a Digital Signal Processing (DSP)-based voice synthesizer.

In an example embodiment, the user device, including and not limited to the OCD, includes an onboard voice synthesizer module to generate synthesized voices. Turning to FIG. 21, the onboard voice synthesizer is a Digital Signal Processing (DSP) based system that resides on the user device. It includes one or more synthesized voice libraries. It also includes a text processor, an assembler, a linker module, a simulator, a loader, a DSP accelerator module which is managed by a hardware resources manager, and a voice acquisition and synthesis module (e.g. an analog/digital converter and digital/analog converter). The voice acquisition and synthesis module is in data communication with a microphone and an audio speaker.

Figure 22:
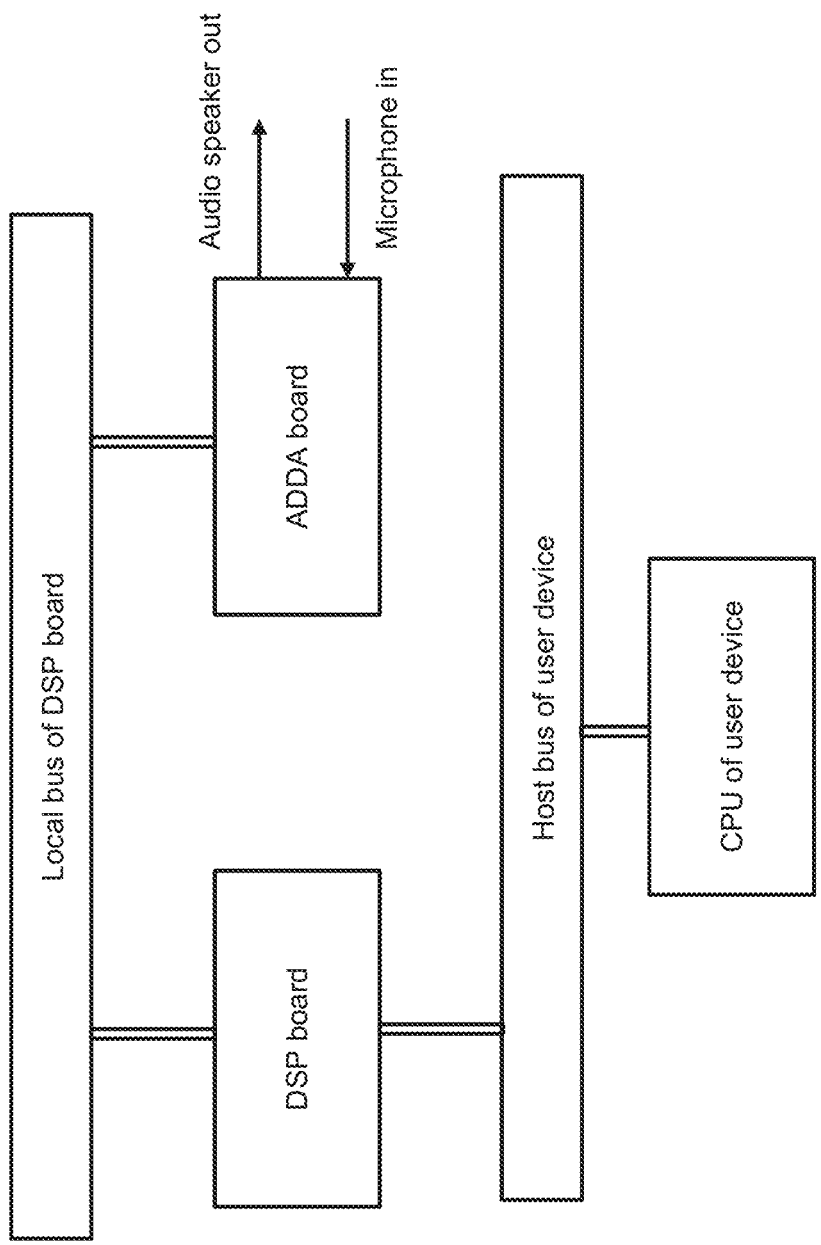
FIG. 22 is an example embodiment of a hardware system used by the DSP-based voice synthesizer.

FIG. 22 shows an example subset of components on a user device, which includes a DSP board/chip, an ADDA2 board/chip, a local bus of the DSP board, a host bus, and a CPU of the smart device. These components, for example, support the software architecture shown in FIG. 21.

It will be appreciated that different software and component architectures (i.e. different from the example architectures shown in FIGS. 21 and 22) in a user device can be used to facilitate outputting synthesized voice data.

In an example embodiment, a given behavior bot detects the current behavior of the user and selects a synthesized voice library to generate a voice presentation of data to the user that is responsive to the current behavior of the user. For example, if the user is detected to be sad, the behavior bot selects a synthesized voice library that is cheerful. In addition or in in alternative, the synthesized voice library synthesizes the voice of a person that is familiar to the user (e.g. their friend, their family member, their coach, their mentor, etc.). In another example, if the user is detected to be depressed or umotivated, the behavior bot responsively selects a synthesized voice library of a coach which has motivating voice characteristics, and generates a voice presentation of data using the coach's synthesized voice library.

Additional general example embodiments and aspects are described below.

In a general example embodiment, a distributed computing system is provided that includes server machines that form a data enablement platform, the data enablement platform comprises: a plurality of data collectors that stream data over a message bus to a streaming analytics and machine learning engine; a data lake and a massive indexing repository for respectively storing and indexing data; a behavioral analytics and machine learning module; and multiple application programming interfaces (APIs) to interact with the data lake and the massive indexing repository, and to interact with multiple applications. The multiple applications comprise multiple command cards. A given command card is specific to a given user and the given command card comprises a directive module that stores a given directive, a memory module, one or more search bots that search for data that is relevant to the given directive, and one or more behavior bots that process the data obtained by the one or more search bots according to one or more behavioral attributes of the given user.

In an example aspect, the one or more behavior bots apply one or more artificial restrictions to the data obtained by the one or more search bots, and the one or more artificial restrictions are associated with the one or more behavioral attributes of the given user.

In another example aspect, the one or more behavior bots combine data from a different topic to the data obtained by the one or more search bots, and the data from the different topic is associated with the one or more behavioral attributes of the given user.

In another example aspect, the one or more search bots search for the data that is relevant to the given directive taking into account one or more criteria related to the given directive; and the one or more behavior bots assess one or more attributes of the data obtained by the search bots; wherein the one or more attributes of the data are unrelated to the given directive and are associated with the one or more behavioral attributes of the given user.

In another example aspect, the data obtained by the search bots is ranked according the one or more attributes.

In another example aspect, the one or more behavior bots generate a voice presentation of the data obtained by the one or more search bots in a voice that is responsive to a current behavioral attribute of the given user.

In another example aspect, if the given user is detected to be in a sad mood or agitated mood, the one or more behavior bots generate the voice presentation in a cheerful voice.

In another example aspect, if the given user is detected to be in a sad mood or agitated mood, the one or more behavior bots generate the voice presentation in a voice that is familiar to the given user.

In another example aspect, if the given user is detected to be in a busy or concentrated mood, the one or more behavior bots generate the voice presentation in a neutral voice.

In another example aspect, if the given user is detected to be in a busy or concentrated mood, the one or more behavior bots generate the voice presentation with words that are spoken quickly.

In another example aspect, the computing system further comprises one or more synthesized voice libraries, wherein each of the one or more synthesized voice libraries comprise voice parameter features of one or more corresponding people, and the one or more behavior bots select at least one of the synthesized voice libraries to generate the voice presentation.

In another example aspect, the voice parameter features comprise two or more of: tone; frequency; loudness; rate at which a word or phrase is said; phonetic pronunciation; lexicon; syntax; articulation; rhythm; and melody.

In another example aspect, in the given command card, there are multiple search bots that are each assigned to a different data source, and the multiple search bots all search for data that is relevant to the given directive of the given command card.

In another example aspect, the plurality of data collectors comprise multiple search bots from the multiple command cards, and each search bot generates a separate and parallel stream of data.

In another example aspect, the streaming analytics and machine learning engine comprises the multiple search bots from the multiple command cards, and each search bots generates a parallel stream of data.

In another example aspect, a first search bot has a first set of streaming analytics modules to process data collected from a first data source, and the second search bot has a second set of streaming analytics modules to process data collected from a second data source.

In another example aspect, the behavioral analytics and machine learning module comprises multiple behavior bots that monitor user interaction data via a user interface, and further process the data to obtain personalized data.

In another example aspect, the memory module of a given command card is provisioned on the data lake and the massive indexing repository, and the personalized data is stored in the memory module of the given command card.

In another example aspect, data links to source data and data summarizations of the personalized data are stored in the memory module of the given command card.

In another example aspect, the given directive is obtained by processing speech data of the given user.

In another example aspect, the speech data is derived from data recorded by a microphone that detects the given user's voice.

In another example aspect, the speech data is derived from data recorded by at least one of a brain signal sensor, a muscle signal sensor and a nerve signal sensor that is on the given user.

In another example aspect, the one or more behavioral attributes of the given user are derived from user data obtained using at least one of a brain signal sensor, a muscle signal sensor, and a nerve signal sensor that is on the given user.

In an example aspect, the oral computing device is a wearable device to dynamically interact with the data. For example, the wearable device includes inertial measurement sensors. In another example, the wearable device is a smart watch. In another example, the wearable device is a headset. In another example, the wearable device projects images to provide augmented reality.

In another example aspect, the oral computing device projects light images on surrounding surfaces to provide augmented reality of virtual reality. In another example aspect, the oral computing device is in data connection with other devices that projects light images to provide augmented reality or virtual reality in a room. In effect, people that are physically present in the room, or virtual people being displayed by the projected light images, simultaneously interact and collaborate with each other using their command cards.

In an example aspect, the oral computing device includes a graphics processing unit (GPU) that exchanges data with the processor, the GPU configured to pre-process the audio data using parallel threaded computations to extract data features, and the data communication device transmits the extracted data features in association with the contextual data and the audio data.

In an example embodiment, the oral computing device is a user device 102 or the specific embodiment of the OCD 301.

In another general example embodiment, a data enablement system (also herein called the data enablement platform) is provided that includes cloud computing servers that ingest audio data originating from one or more user devices, the audio data comprising at least oral conversation of one or more users, and the cloud computing servers configured to apply machine learning computations to extract at least content and sentiment data features.

There are also data science servers that are in data communication with the cloud computing servers and an external artificial intelligence computing platform. The data science servers also include a library of data science algorithms used to process the content and sentiment features. In other words, the data science algorithms may also be specific to given search bots or behavior bots. The data science servers output response data to the cloud computing servers, the response data being in response to the audio data.

Subsequently, the cloud computing servers format the response data into an audio data format playable by a given user device, and transmit the formatted response data.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the servers or computing devices or accessible or connectable thereto. Any application or module herein described may be implemented using computer readable/executable instructions that may be stored or otherwise held by such computer readable media.

It will be appreciated that different features of the example embodiments of the system and methods, as described herein, may be combined with each other in different ways. In other words, different devices, modules, operations, functionality and components may be used together according to other example embodiments, although not specifically stated.

The steps or operations in the flow diagrams described herein are just for example. There may be many variations to these steps or operations according to the principles described herein. For instance, the steps may be performed in a differing order, or steps may be added, deleted, or modified.

The GUIs and screen shots described herein are just for example. There may be variations to the graphical and interactive elements according to the principles described herein. For example, such elements can be positioned in different places, or added, deleted, or modified.

It will also be appreciated that the examples and corresponding system diagrams used herein are for illustrative purposes only. Different configurations and terminology can be used without departing from the principles expressed herein. For instance, components and modules can be added, deleted, modified, or arranged with differing connections without departing from these principles.

Although the above has been described with reference to certain specific embodiments, various modifications thereof will be apparent to those skilled in the art without departing from the scope of the claims appended hereto.

The invention claimed is:

1. A server system comprising:
a first command card and a second command card both specific to a given user, and accessible by a data enablement application;
the first command card comprising a first directive and is associated with one or more first search bots searching for data specific to the first directive;
the second command card comprising a second directive and is associated with one or more secondary search bots searching for data specific to the second directive; and
one or more behavior bots that process the data specific to the first directive and the data specific to the second directive based on behavior data of the given user to produce outputted data for the data enablement application.

2. The server system of claim 1 wherein the data enablement application comprises a first mode associated with the first command card, and a second mode associated with the second command card.

3. The server system of claim 2 wherein the data enablement application resides on a user device of the given user, and one of the first mode and the second mode is activated based on a selection provided by the given user.

4. The server system of claim 2 wherein the data enablement application resides on a user device of the given user, and one of the first mode and the second mode is activated autonomously.

5. The server system of claim 1 wherein the one or more behavior bots modify presentation of the outputted data based on the behavior data.

6. The server system of claim 1 a digital voice is used to present the outputted data to the given user, and the one or more behavior bots modify the digital voice based on the behavior data.

7. The server system of claim 1 wherein the first command card and the second command card each comprise a digital container.

8. The server system of claim 1 wherein the behavior data is extracted from voice data of the given user.

9. The server system of claim 1 wherein the behavior data is derived from one or more touch screen gestures of the given user.

10. The server system of claim 1 wherein the behavior data is derived from one or more facial expressions of the given user.

11. The server system of claim 1 wherein the behavior data is derived from brain signals of the given user.

12. The server system of claim 1 wherein the behavior data is derived from nerve signals of the given user.

13. The server system of claim 1 wherein the behavior data is derived from movements of the given user.

14. A user device comprising:
a display device, a microphone, a speaker, a processor, a communication module and memory;
a data enablement application residing on memory and comprising a first command card and a second command card both specific to a given user;
the first command card comprising a first directive and is associated with one or more first search bots searching for data specific to the first directive;
the second command card comprising a second directive and is associated with one or more secondary search bots searching for data specific to the second directive; and,
one or more behavior bots that process the data specific to the first directive and the data specific to the second directive based on behavior data of the given user to produce outputted data for the data enablement application.

15. The user device of claim 14 wherein the data enablement application comprises a first mode associated with the first command card, and a second mode associated with the second command card.

16. The user device of claim 15 wherein one of the first mode and the second mode is activated based on a selection provided by the given user.

17. The user device of claim 15 wherein one of the first mode and the second mode is activated autonomously.

18. The user device of claim 14 wherein the one or more behavior bots modify presentation of the outputted data based on the behavior data.

19. The user device of claim 14 wherein a digital voice is used to present the outputted data to the given user, and the one or more behavior bots modify the digital voice based on the behavior data.

20. The user device of claim 14 wherein the first command card and the second command card each comprise a digital container.

21. The user device of claim 14 wherein the behavior data is extracted from voice data of the given user.

22. The user device of claim 14 wherein the behavior data is derived from one or more touch screen gestures of the given user.

23. The user device of claim 14 wherein the behavior data is derived from one or more facial expressions of the given user.

24. The user device of claim 14 wherein the behavior data is derived from brain signals of the given user.

25. The user device of claim 14 wherein the behavior data is derived from nerve signals of the given user.

26. The user device of claim 14 wherein the behavior data is derived from movements of the given user.

\* \* \* \* \*